(12) United States Patent
Zhou et al.

(10) Patent No.: US 11,546,043 B2
(45) Date of Patent: Jan. 3, 2023

(54) QUASI CO-LOCATION RESET FOR A USER EQUIPMENT SUPPORTING A SINGLE ACTIVE TRANSMISSION CONFIGURATION INDICATION STATE

(71) Applicant: QUALCOMM Incorporated, San Diego, CA (US)

(72) Inventors: Yan Zhou, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/719,826

(22) Filed: Dec. 18, 2019

(65) Prior Publication Data

US 2020/0204247 A1 Jun. 25, 2020

Related U.S. Application Data

(60) Provisional application No. 62/782,822, filed on Dec. 20, 2018.

(51) Int. Cl.
*H04B 7/08* (2006.01)
*H04L 5/00* (2006.01)
(Continued)

(52) U.S. Cl.
CPC ........... *H04B 7/088* (2013.01); *H04B 7/0628* (2013.01); *H04B 7/0695* (2013.01);
(Continued)

(58) Field of Classification Search
CPC . H04B 7/0695; H04B 7/088; H04W 74/0833; H04W 72/046
See application file for complete search history.

(56) References Cited

U.S. PATENT DOCUMENTS 9,531,448 B2 12/2016 Sesia et al.
2018/0219606 A1 8/2018 Ng et al.
(Continued)

FOREIGN PATENT DOCUMENTS

WO WO-2018016907 A1 1/2018
WO WO-2019161181 A1 8/2019
WO WO-2020088940 A1 * 5/2020 ........... H04B 7/0695

OTHER PUBLICATIONS

International Search Report and Written Opinion—PCT/US2019/067388—ISA/EPO—dated Mar. 17, 2020.
U.S. Appl. No. 62/782,822, filed Dec. 20, 2018, 95 pages.

*Primary Examiner* — Ayaz R Sheikh
*Assistant Examiner* — Debebe A Asefa
(74) *Attorney, Agent, or Firm* — Danai Nelisile Mhembere; Holland & Hart LLP

(57) ABSTRACT

Methods, systems, and devices for wireless communications are described. A user equipment (UE) with the capability to support a single active TCI state may receive configuration signaling which configures the UE with an active transmission configuration indication (TCI) state corresponding to a first beam for a control resource set and a shared data channel. The UE may perform a random access channel procedure to select a second beam from a set of different beams. The UE may update a quasi co-location (QCL) assumption for the control resource set to correspond to the second beam and deactivate the active TCI state based on updating the QCL assumption. The UE may then monitor the control resource set, the shared data channel, or both, using the second beam. The UE may deactivate the TCI state and use the indicated downlink beam so that the UE does not exceed its capability.

30 Claims, 19 Drawing Sheets

(51) Int. Cl.
    *H04W 74/08*     (2009.01)
    *H04B 7/06*     (2006.01)
    *H04L 27/26*     (2006.01)
    *H04W 72/04*     (2009.01)
    *H04W 28/02*     (2009.01)

(52) U.S. Cl.
    CPC .......... *H04L 5/0023* (2013.01); *H04L 5/0048* (2013.01); *H04L 5/0053* (2013.01); *H04L 27/2657* (2013.01); *H04L 27/2675* (2013.01); *H04W 28/0215* (2013.01); *H04W 72/042* (2013.01); *H04W 74/0833* (2013.01)

(56) References Cited

U.S. PATENT DOCUMENTS

| | | | |
|---|---|---|---|
| 2018/0302889 A1* | 10/2018 | Guo | H04B 7/0617 |
| 2019/0045494 A1 | 2/2019 | Ho et al. | |
| 2019/0116467 A1 | 4/2019 | Belleschi et al. | |
| 2019/0222357 A1 | 7/2019 | Huang et al. | |
| 2019/0306909 A1* | 10/2019 | Zhou | H04B 7/08 |
| 2021/0036829 A1* | 2/2021 | Kuang | H04W 72/042 |

* cited by examiner

QUASI CO-LOCATION RESET FOR A USER EQUIPMENT SUPPORTING A SINGLE ACTIVE TRANSMISSION CONFIGURATION INDICATION STATE

CROSS REFERENCE

The present Application for Patent claims the benefit of U.S. Provisional Patent Application No. 62/782,822 by ZHOU et al., entitled "QUASI CO-LOCATION RESET FOR A USER EQUIPMENT SUPPORTING A SINGLE ACTIVE TRANSMISSION CONFIGURATION INDICATION STATE," filed Dec. 20, 2018, assigned to the assignee hereof, and expressly incorporated herein.

BACKGROUND

The following relates generally to wireless communications, and more specifically to quasi co-location reset for a user equipment supporting a single active transmission configuration indication state.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations or network access nodes, each simultaneously supporting communication for multiple communication devices, which may be otherwise known as user equipment (UE). In some wireless communications systems, a base station and a UE may exchange control information and data on one or more beams. In some cases, the UE may be configured to use a limited number of active receive beams. Conventional techniques for managing active receive beams at the UE may be deficient.

SUMMARY

The described techniques relate to improved methods, systems, devices, and apparatuses that support quasi co-location (QCL) reset for a user equipment (UE) supporting a single active transmission configuration indication (TCI) state. In some wireless communications systems, a UE and a base station may use beamformed communications, and the UE and base station may identify a suitable transmit and receive beam pair for communicating data and control information. The base station may configure a downlink receive beam at the UE by transmitting an indication of a transmission configuration indicator (TCI) to the UE. The TCI may include a QCL reference that indicates to the UE which receive beam to select that corresponds to a downlink transmit beam being used by the base station for downlink transmissions. For example, the QCL reference may indicate spatial characteristics of the base station transmit beam such that the UE can select a corresponding receive beam. The QCL reference may indicate a relationship between a reference signal and a scheduled downlink transmission, and the UE may assume channel characteristics for the downlink transmission based on the reference signal. The UE may determine the spatial characteristics (e.g., direction), Doppler spread, Doppler shift, average delay, and average spread, or any combination thereof, for the downlink transmission based on the QCL reference indicated in the received TCI state.

In some examples, the UE may be configured with one or more TCI state configurations. Different TCI states, distinguished by different values of the TCI, may correspond to QCL relationships with different reference signal transmissions. By configuring the TCI states at the UE, the base station can dynamically select beams for downlink transmission to the UE, and the UE can select the corresponding receive beam to receive the downlink transmission. In some cases, the number of active TCI states configured at the UE may be limited based on UE capability. The UE may report its capability for a number of supported active TCI states to the base station, and the base station may configure that many active QCL assumptions for downlink control and data transmissions. By limiting the number of active beams, the complexity at a UE associated with identifying a beam for communicating with a base station may be reduced.

There may be situations where the QCL assumption for a control resource set is updated. For example, during a random access channel procedure, the base station may transmit multiple reference signals on different beams during the random access channel procedure, and the UE may transmit a random access channel preamble indicating the beam with the strongest reference signal. Upon indicating the downlink beam, the QCL assumption for control resource set 0 may be updated to the indicated downlink beam. The base station may transmit a random access channel response message on the downlink beam in response to receiving the random access channel preamble. If the UE is capable of supporting one active QCL assumption, then the UE may already have an active TCI state which uses a different receive beam. Using an additional receive beam to receive control and data information for the updated control resource set would exceed the UE capability.

Therefore, a UE described herein may implement techniques for a QCL assumption reset when supporting a single active TCI state. For a UE that supports a single active TCI state, the base station configures the UE with an active TCI state. When the UE performs a random access channel procedure, the UE may select a downlink beam for the random access procedure which may not correspond to the single active TCI state configured by the base station. In some cases, the UE may deactivate the single active TCI state and instead use a QCL assumption that corresponds to the selected downlink beam to subsequently receive control and data transmissions. The UE may then use the downlink beam indicated in the random access channel procedure for up to all downlink shared channel and downlink control channel monitoring. In some examples, the UE may use the indicated downlink beam at least until an identified reference time. After the identified reference time, the UE may continue to use the indicated downlink beam, or the UE may switch back to the beam associated with the single active TCI state. By using the techniques described herein, a UE with the capability to support a single active TCI state may deactivate the active TCI state after performing a random access channel procedure and instead use a downlink beam selected during the random access channel procedure so that the UE does not exceed its capability.

A method of wireless communication by a UE is described. The method may include receiving configuration signaling configuring the UE with a first active transmission configuration indication state corresponding to a first beam for a control resource set and a shared data channel, performing a random access channel procedure to select a second beam from a set of different beams, updating a quasi co-location assumption for the control resource set to correspond to the second beam, and monitoring the control resource set, the shared data channel, or both, using the second beam.

An apparatus for wireless communication by a UE is described. The apparatus may include a processor, memory in electronic communication with the processor, and instructions stored in the memory. The instructions may be executable by the processor to cause the apparatus to receive configuration signaling configuring the UE with a first active transmission configuration indication state corresponding to a first beam for a control resource set and a shared data channel, perform a random access channel procedure to select a second beam from a set of different beams, update a quasi co-location assumption for the control resource set to correspond to the second beam, and monitor the control resource set, the shared data channel, or both, using the second beam.

Another apparatus for wireless communication by a UE is described. The apparatus may include means for receiving configuration signaling configuring the UE with a first active transmission configuration indication state corresponding to a first beam for a control resource set and a shared data channel, performing a random access channel procedure to select a second beam from a set of different beams, updating a quasi co-location assumption for the control resource set to correspond to the second beam, and monitoring the control resource set, the shared data channel, or both, using the second beam.

A non-transitory computer-readable medium storing code for wireless communication by a UE is described. The code may include instructions executable by a processor to receive configuration signaling configuring the UE with a first active transmission configuration indication state corresponding to a first beam for a control resource set and a shared data channel, perform a random access channel procedure to select a second beam from a set of different beams, update a quasi co-location assumption for the control resource set to correspond to the second beam, and monitor the control resource set, the shared data channel, or both, using the second beam.

Some examples of the method, apparatuses, and non-transitory computer-readable medium described herein may further include operations, features, means, or instructions for deactivating the first active transmission configuration indication state based on updating the quasi co-location assumption.

Some examples of the method, apparatuses, and non-transitory computer-readable medium described herein may further include operations, features, means, or instructions for monitoring the control resource set, the shared data channel, or both, using the second beam at least until a reference time associated with the random access procedure.

Some examples of the method, apparatuses, and non-transitory computer-readable medium described herein may further include operations, features, means, or instructions for monitoring the control resource set, the shared data channel, or both, using the first beam after the reference time.

Some examples of the method, apparatuses, and non-transitory computer-readable medium described herein may further include operations, features, means, or instructions for monitoring the control resource set, the shared data channel, or both, using the second beam after the reference time.

Some examples of the method, apparatuses, and non-transitory computer-readable medium described herein may further include operations, features, means, or instructions for deactivating the first active transmission configuration indication state based on updating the quasi co-location assumption.

In some examples of the method, apparatuses, and non-transitory computer-readable medium described herein, the reference time may be based on an end of a random access response window, an end of the random access procedure, or a random access timer, or any combination thereof.

In some examples of the method, apparatuses, and non-transitory computer-readable medium described herein, monitoring the control resource set, the shared data channel, or both, using the second beam further may include operations, features, means, or instructions for receiving, using the second beam, a control channel transmission via the control resource set.

In some examples of the method, apparatuses, and non-transitory computer-readable medium described herein, monitoring the control resource set, the shared data channel, or both, using the second beam further may include operations, features, means, or instructions for receiving, using the second beam, a data transmission via the shared data channel.

Some examples of the method, apparatuses, and non-transitory computer-readable medium described herein may further include operations, features, means, or instructions for receiving second configuration signaling configuring a second active transmission configuration indication state, and monitoring the control resource set, the shared data channel, or both, using a third beam that corresponds to the second active transmission configuration indication state.

In some examples of the method, apparatuses, and non-transitory computer-readable medium described herein, the second active transmission configuration indication state differs from the first active transmission configuration indication state.

In some examples of the method, apparatuses, and non-transitory computer-readable medium described herein, monitoring the control resource set, the shared data channel, or both, using the third beam further may include operations, features, means, or instructions for receiving, using the third beam, a control channel transmission via the control resource set.

In some examples of the method, apparatuses, and non-transitory computer-readable medium described herein, monitoring the control resource set, the shared data channel, or both, using the third beam further may include operations, features, means, or instructions for receiving, using the third beam, a data transmission via the shared data channel.

In some examples of the method, apparatuses, and non-transitory computer-readable medium described herein, performing the random access channel procedure to select the second beam further may include operations, features, means, or instructions for generating a set of reference signal measurements that each correspond to a respective beam of the set of different beams, and selecting the second beam based on the set of reference signal measurements.

Some examples of the method, apparatuses, and non-transitory computer-readable medium described herein may further include operations, features, means, or instructions for transmitting capability signaling indicating that the UE supports a defined (e.g., limited) number of active transmission configuration indication states, where the configuration signaling may be based on the capability signaling.

In some examples of the method, apparatuses, and non-transitory computer-readable medium described herein, the defined number of active transmission configuration indication states indicates the UE only supports a defined number of one or more active downlink receive beams shared by both control and data channels.

Some examples of the method, apparatuses, and non-transitory computer-readable medium described herein may further include operations, features, means, or instructions for configuring, based on updating the quasi co-location assumption for the control resource to correspond to the second beam, a receiver or a transmitter to use the second beam.

A method of wireless communication by a base station is described. The method may include transmitting configuration signaling configuring a UE with a first active transmission configuration indication state corresponding to a first beam for a control resource set and a shared data channel, performing a random access channel procedure with the UE to select a second beam from a set of different beams, updating a quasi co-location assumption for the control resource set based on selecting the second beam, and transmitting a transmission within the control resource set or the shared data channel using the second beam.

An apparatus for wireless communication by a base station is described. The apparatus may include a processor, memory in electronic communication with the processor, and instructions stored in the memory. The instructions may be executable by the processor to cause the apparatus to transmit configuration signaling configuring a UE with a first active transmission configuration indication state corresponding to a first beam for a control resource set and a shared data channel, perform a random access channel procedure with the UE to select a second beam from a set of different beams, update a quasi co-location assumption for the control resource set based on selecting the second beam, and transmit a transmission within the control resource set or the shared data channel using the second beam.

Another apparatus for wireless communication by a base station is described. The apparatus may include means for transmitting configuration signaling configuring a UE with a first active transmission configuration indication state corresponding to a first beam for a control resource set and a shared data channel, performing a random access channel procedure with the UE to select a second beam from a set of different beams, updating a quasi co-location assumption for the control resource set based on selecting the second beam, and transmitting a transmission within the control resource set or the shared data channel using the second beam.

A non-transitory computer-readable medium storing code for wireless communication by a base station is described. The code may include instructions executable by a processor to transmit configuration signaling configuring a UE with a first active transmission configuration indication state corresponding to a first beam for a control resource set and a shared data channel, perform a random access channel procedure with the UE to select a second beam from a set of different beams, update a quasi co-location assumption for the control resource set based on selecting the second beam, and transmit a transmission within the control resource set or the shared data channel using the second beam.

Some examples of the method, apparatuses, and non-transitory computer-readable medium described herein may further include operations, features, means, or instructions for deactivating the first active transmission configuration indication state based on updating the quasi co-location assumption Some examples of the method, apparatuses, and non-transitory computer-readable medium described herein may further include operations, features, means, or instructions for transmitting within the control resource set, the shared data channel, or both, using the second beam at least until a reference time associated with the random access procedure.

Some examples of the method, apparatuses, and non-transitory computer-readable medium described herein may further include operations, features, means, or instructions for transmitting within the control resource set, the shared data channel, or both, using the first beam after the reference time.

Some examples of the method, apparatuses, and non-transitory computer-readable medium described herein may further include operations, features, means, or instructions for transmitting within the control resource set, the shared data channel, or both, using the second beam after the reference time.

Some examples of the method, apparatuses, and non-transitory computer-readable medium described herein may further include operations, features, means, or instructions for deactivating the first active transmission configuration indication state based on updating the quasi co-location assumption.

In some examples of the method, apparatuses, and non-transitory computer-readable medium described herein, the reference time may be based at least in part on an end of a random access response window, an end of the random access procedure, or a random access timer, or any combination thereof.

In some examples of the method, apparatuses, and non-transitory computer-readable medium described herein, transmitting the transmission within the control resource set or the shared data channel using the second beam further may include operations, features, means, or instructions for transmitting, using the second beam, a control channel transmission via the control resource set.

In some examples of the method, apparatuses, and non-transitory computer-readable medium described herein, transmitting the transmission within the control resource set or the shared data channel using the second beam further may include operations, features, means, or instructions for transmitting, using the second beam, a data transmission via the shared data channel.

Some examples of the method, apparatuses, and non-transitory computer-readable medium described herein may further include operations, features, means, or instructions for transmitting configuration signaling configuring a second active transmission configuration indication state, and transmitting a second transmission within the control resource set or the shared data channel using a third beam that corresponds to the second active transmission configuration indication state.

In some examples of the method, apparatuses, and non-transitory computer-readable medium described herein, the second active transmission configuration indication state differs from the first active transmission configuration indication state.

In some examples of the method, apparatuses, and non-transitory computer-readable medium described herein, transmitting the second transmission within the control resource set or the shared data channel using the third beam further may include operations, features, means, or instructions for transmitting, using the third beam, a control channel transmission via the control resource set.

In some examples of the method, apparatuses, and non-transitory computer-readable medium described herein, transmitting the second transmission within the control resource set or the shared data channel using the third beam further may include operations, features, means, or instructions for transmitting, using the third beam, a data transmission via the shared data channel.

In some examples of the method, apparatuses, and non-transitory computer-readable medium described herein, performing the random access channel procedure to select the second beam further may include operations, features, means, or instructions for transmitting a reference signal transmission on each beam of the set of different beams, and receiving an indication of the second beam based on transmitting the reference signal transmission on each beam of the set of different beams.

Some examples of the method, apparatuses, and non-transitory computer-readable medium described herein may further include operations, features, means, or instructions for receiving capability signaling indicating that the UE supports a defined number of active transmission configuration indication states, where the configuration signaling may be based on the capability signaling.

In some examples of the method, apparatuses, and non-transitory computer-readable medium described herein, the defined number of active transmission configuration indication states indicates that the UE only supports a defined number of one or more active downlink receive beams shared by both control and data channels.

DETAILED DESCRIPTION

Figure 1:
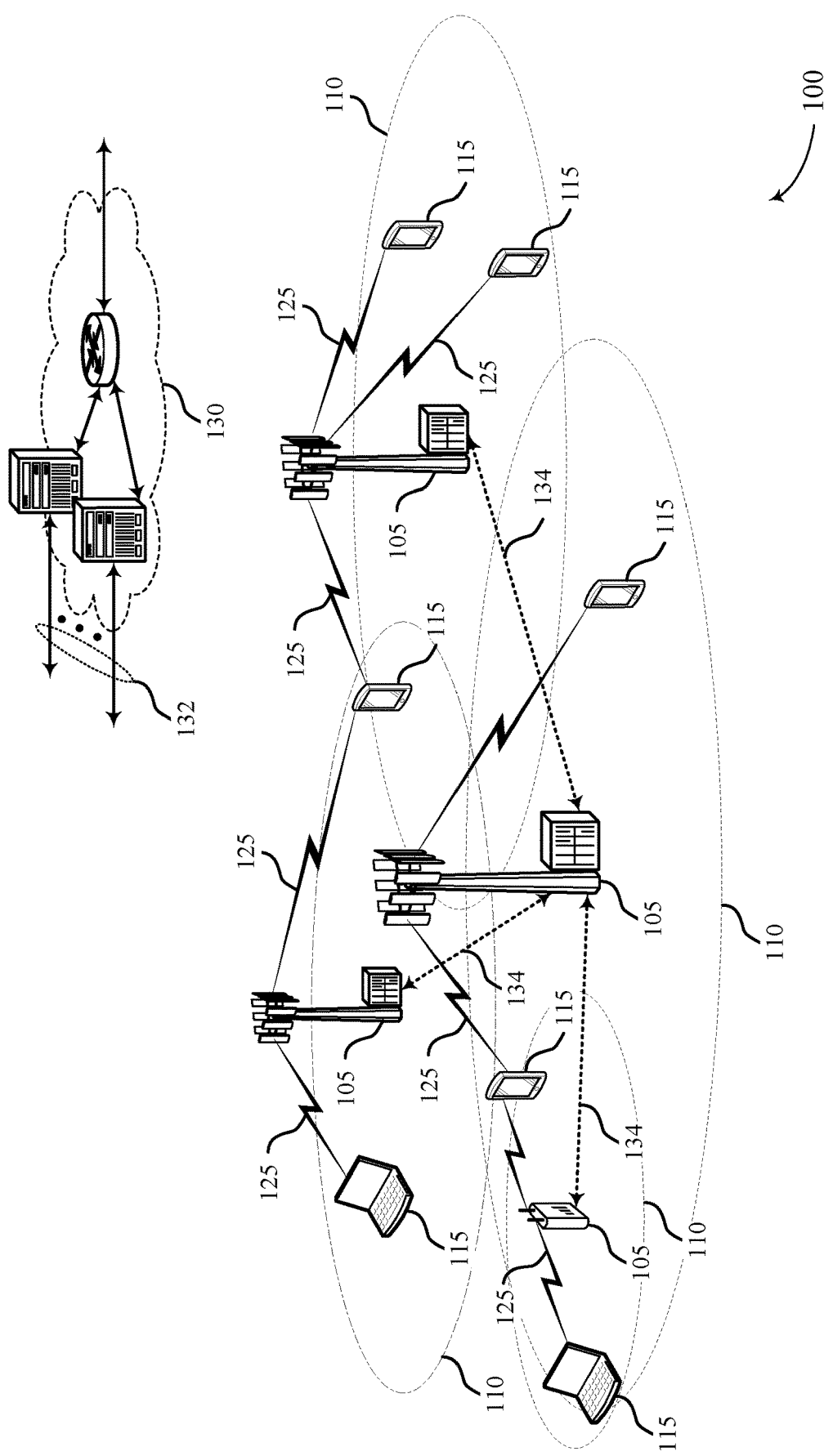
FIG. 1 illustrates an example of a system for wireless communications that supports quasi co-location reset for a user equipment supporting a single active transmission configuration indication state in accordance with aspects of the present disclosure.

In some wireless communications systems, a user equipment (UE) and a base station may use beamformed communications. For example, the base station may directionally transmit or receive using one or more beams (e.g., base station beams), and the UE may directionally receive or transmit using one or more beams (e.g., UE beams). In such systems, the UE may identify a suitable beam for communicating data and control information with the base station. For example, to configure a receive beam at the UE, the base station may transmit an indication of a transmission configuration indicator (TCI) to the UE which includes a quasi co-location (QCL) reference that assists the UE in selecting the receive beam. The QCL reference may indicate a relationship between a previously transmitted reference signal and the scheduled downlink transmission. The QCL relationship may indicate to the UE that the demodulation reference signals of the scheduled downlink transmission are quasi co-located to the previously transmitted reference signal, and the UE can assume the same channel when receiving the schedule downlink transmission as the previously transmitted reference signal. Examples of previously transmitted reference signals may include reference signals transmitted in a synchronizations signal block (SSB), a channel state indicator reference signal (CSI-RS), reference signals transmitted during a random access channel procedure, etc.

The UE may determine the spatial characteristics (e.g., direction), Doppler spread, Doppler shift, average delay, and average spread, or any combination thereof, for the downlink transmission based on the QCL relationship to the indicated TCI state, and the UE may select a receive beam accordingly. In some cases, the UE may select a base station beam and UE beam (e.g., a beam link pair) and transmit an indication of the beam link pair to the base station. For beam selection via control signaling, the base station may identify a beam pair and configure the UE with a beam via downlink control information (DCI) or a Medium Access Control (MAC) control element (MAC CE).

The UE may be configured with one or more TCI state configurations. Different TCI states, distinguished by different values of the TCI, may correspond to QCL relationships with different reference signal transmissions. For example, each TCI state may be associated with one of the previously received reference signals. The TCI state may provide a spatial QCL reference that the UE can use to set the receive beam. By configuring the TCI states at the UE, the base station can dynamically select beams for downlink transmission to the UE, and the UE can select the corresponding receive beam to receive the downlink transmission. For a downlink transmission, the base station may transmit an indication of the TCI state to the UE, and the UE may select the corresponding receive beam based on the indicated TCI state to receive the downlink transmission. The TCI states may be configured via higher layer signaling.

In some cases, the number of active TCI states configured at the UE may be limited based on UE capability. The UE may report its capability for a number of active TCI states to the base station, and the base station may configure that many active QCL assumptions for downlink control and data transmissions. As TCI states correspond to receive beams, if the number of active TCI states is limited at the UE, the number of active downlink receive beams may also be limited. If, for example, the UE indicates one active TCI state, then downlink data and control transmissions may share a single downlink beam. By limiting the number of active beams, the complexity at a UE associated with identifying a beam for communicating with a base station may be reduced. In some cases, however, a UE may identify additional active beams (e.g., different from the beams indicated by the TCI states) available for communicating with a base station based on QCL assumptions.

There may be situations where the QCL assumption for a control resource set is updated. For example, a QCL assumption for a common control resource set associated with handover and cell management (e.g., control resource set 0) may be updated after the UE performs a random access channel procedure. The base station may transmit multiple reference signals on different beams during the random access channel procedure, and the UE may transmit a random access channel preamble indicating the beam with the strongest reference signal. Upon indicating the downlink beam, the QCL assumption for control resource set 0 may be updated to the indicated downlink beam. Thus, the base station may transmit a random access channel response message on the downlink beam in response to receiving the random access channel preamble.

If the UE signals a capability of supporting a single active QCL assumption, the UE may only be capable of using the one single receive beam for downlink shared channel and downlink control channel reception related to all control resource sets. If performing the random access channel procedure updates the QCL assumption for a control resource set to a different TCI state than the active TCI state, the UE would have to use two different receive beams, including one for the active TCI state and one for the updated control resource set. The UE would therefore use two different receive beams, which would exceed the capability of the UE. Instead, a UE described herein may implement techniques for a QCL assumption reset when supporting a single active TCI state.

For example, if a UE performs a random access channel procedure and indicates a downlink beam in the random access channel preamble which does not correspond to a first single active TCI state, the UE may deactivate the first single active TCI state. The UE may then use the downlink beam indicated in the random access channel procedure for all downlink shared channel and downlink control channel monitoring. For example, the UE may perform the random access channel procedure, indicate a downlink beam that does not correspond to the configured TCI state, and update the QCL assumption for control resource set 0 to a reference signal associated with the indicated downlink beam.

In some cases, the UE may identify a reference time associated with the random access procedure (e.g., an end of a random access response (RAR) window, an end of the random access procedure, a random access timer expiring, etc.). The UE may use the indicated downlink beam at least until the reference time. The UE may then continue to use the selected beam after the reference time has passed, or the UE may revert to using the downlink beam associated with the first active TCI state. In some cases, the UE may deactivate the first active TCI state so that downlink control and data transmissions related to all control resource sets are based on the receive beam used for control resource set 0. In some cases, the UE may reconfigure the active TCI state to the indicated downlink beam.

A UE may support a single active TCI state, and the base station may configure the UE with an active TCI state. When the UE performs a random access channel procedure, the UE may select a downlink beam for the random access procedure which does not correspond to the single active TCI state configured by the base station. The UE may deactivate the single active TCI state and instead use a QCL assumption that corresponds to the selected downlink beam to receive control and data transmissions.

Aspects of the disclosure are initially described in the context of a wireless communications system. Aspects of the disclosure are further illustrated by and described with reference to apparatus diagrams, timelines, system diagrams, and flowcharts that relate to quasi co-location reset for a user equipment supporting a single active transmission configuration indication state.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 and a base station 105 may use beamformed communications. The base station 105 may configure a downlink receive beam at the UE 115 by transmitting an indication of a TCI to the UE 115. The TCI may include a QCL reference that assists the UE 115 in selecting the receive beam. For example, the QCL reference may indicate spatial characteristics of the base station transmit beam such that the UE can select an appropriate receive beam. The UE 115 may be configured with one or more TCI state configurations. Different TCI states, distinguished by different values of the TCI, may correspond to QCL relationships with different reference signal transmissions. By configuring the TCI states at the UE 115, the base station 105 can dynamically select beams for downlink transmission to the UE 115, and the UE 115 can select the corresponding receive beam to receive the downlink transmission. In some cases, the number of active TCI states configured at the UE 115 may be limited based on UE capability. The UE 115 may report its capability for a number of active TCI states to the base station, and the base station 105 may configure that many active QCL assumptions for downlink control and data transmissions.

There may be situations where the QCL assumption for a control resource set is updated. For example, during a random access channel procedure, the base station 105 may transmit multiple reference signals on different beams during the random access channel procedure, and the UE 115 may transmit a random access channel preamble indicating the beam with the strongest reference signal. Upon indicating the downlink beam, the QCL assumption for a control resource set (e.g., control resource set 0) may be updated to the indicated downlink beam. The base station 105 may transmit a random access channel response message on the downlink beam in response to receiving the random access channel preamble. If the UE 115 is capable of supporting one active QCL assumption, then the UE 115 may already have an active TCI state which uses a different receive beam. Using an additional receive beam to receive control and data information for the updated control resource set would exceed the UE capability.

Therefore, a UE 115 described herein may implement techniques for a QCL assumption reset when supporting a single active TCI state. The UE which supports a single active TCI state may be configured by a base station with a single active TCI state. If the UE 115 performs a random access channel procedure and indicates a downlink beam in the random access channel preamble which does not correspond to the single active TCI state, the UE 115 may update the QCL assumption for a control resource set, which may lead to the UE 115 exceeding its capable number of receive beams. In some cases, the UE 115 may deactivate the single active TCI state and instead use a QCL assumption corresponding to the selected receive beam to receive control and data transmissions. The UE 115 may then use the downlink beam indicated in the random access channel procedure for all downlink shared channel and downlink control channel monitoring. In some cases, the base station 105 may subsequently reconfigure the active TCI state of the UE 115 to correspond to the indicated downlink beam or a different beam. By using the techniques described herein, a UE 115 with the capability to support a single active TCI state may deactivate the active TCI state after performing a random access channel procedure and instead use a downlink beam selected during the random access channel procedure so that the UE 115 does not exceed its capability.

Figure 2:
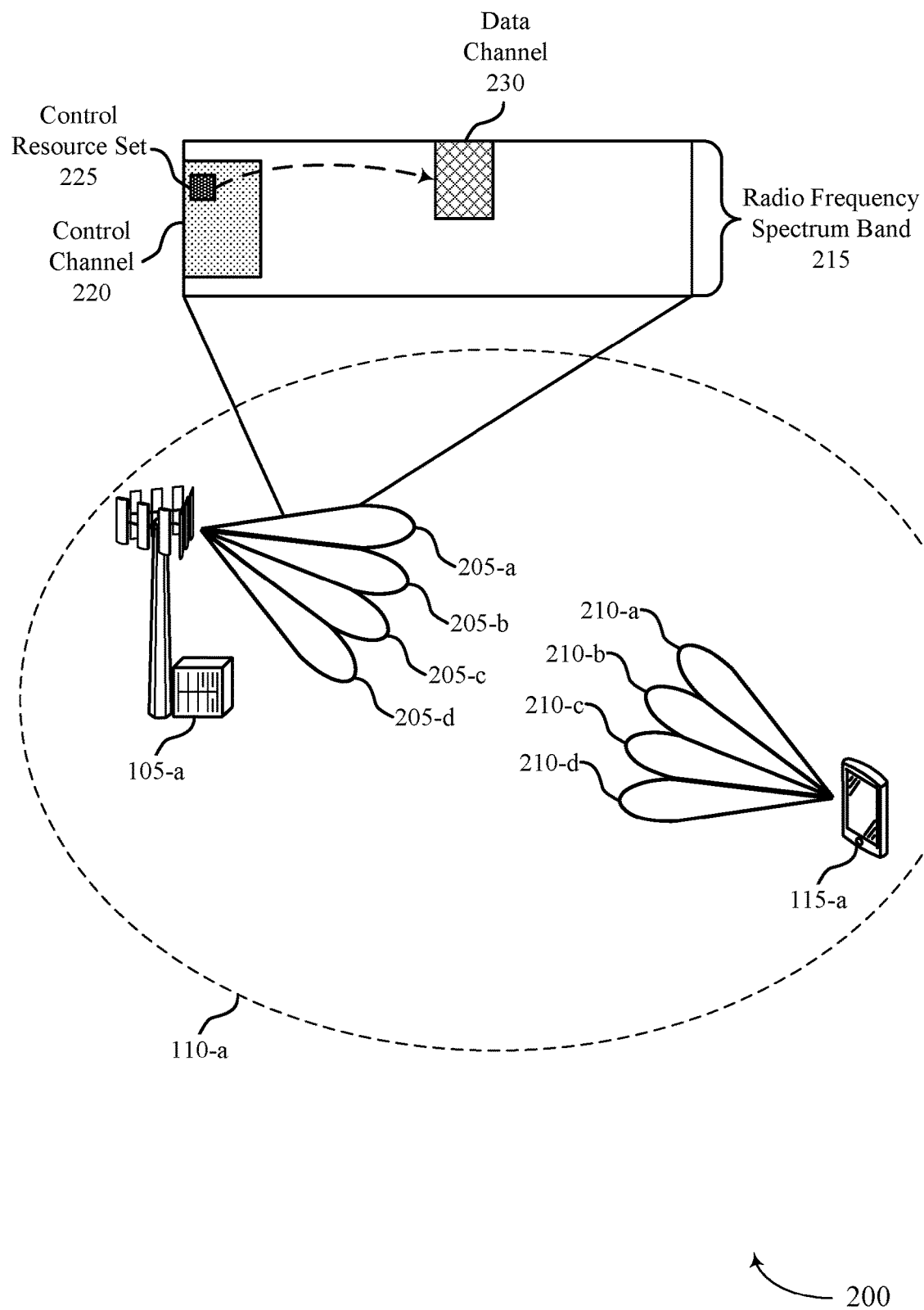
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may implement aspects of wireless communications system 100.

The wireless communications system 200 may include UE 115-*a* and base station 105-*a*, which may be respective examples of a UE 115 and a base station 105 as described herein. UE 115-*a* and base station 105-*a* may communicate using beamformed communications. For example, base station 105-*a* may directionally transmit or receive using one or more beams (e.g., base station beams 205), and UE 115-*a* may directionally receive or transmit using one or more beams (e.g., UE beams 210).

UE 115-*a* may identify a receive beam which is suitable for downlink data and control communications with base station 105-*a*. In some cases, base station 105-*a* may configure a downlink receive beam for UE 115-*a*. For example, to configure the downlink receive beam at UE 115-*a*, base station 105-*a* may transmit an indication of a TCI to UE 115-*a*. The TCI may include a QCL reference that assists UE 115-*a* in selecting the receive beam.

A QCL reference may indicate a relationship between a previously transmitted reference signal and the scheduled downlink transmission. The QCL relationship may indicate to UE 115-*a* that the downlink shared channel demodulation reference signals of the scheduled downlink transmission are quasi co-located to the previously transmitted reference signal, and UE 115-*a* can assume the same channel when receiving the schedule downlink transmission as the previously transmitted reference signal. UE 115-*a* may use DM-RS as a reference signal for decoding PDSCH transmissions. Therefore, if UE 115-*a* assumes the scheduled downlink transmission from base station 105-*a* has the same demodulation reference signals as a previously received reference signal, UE 115-*a* may be able to reuse the channel assumptions to receive the scheduled downlink transmission. Examples of previously transmitted reference signals may include reference signals transmitted in a SSB, a CSI-RS, reference signals transmitted during a random access channel procedure (e.g., a random access channel (RACH) procedure), etc.

UE 115-*a* may determine spatial characteristics (e.g., the direction), Doppler spread, Doppler shift, average delay, and average spread, or any combination thereof, for the downlink transmission based on the QCL relationship to the indicated TCI state, and UE 115-*a* may select a receive beam accordingly. In some cases, UE 115-*a* may select a base station beam 205 and a UE beam 210, which may be referred to as a beam link pair together. For example, if the QCL relationship indicates the direction of the downlink transmit beam, UE 115-*a* may select a corresponding downlink receive beam pointed in a direction which provides the strongest beam pair link connection. In some cases, UE 115-*a* may transmit an indication of the beam link pair to base station 105-*a*. For beam selection via control signaling, base station 105-*a* may identify a beam pair and configure UE 115-*a* with a downlink beam via DCI or a MAC CE.

UE 115-*a* may be configured with one or more TCI state configurations. Different TCI states, distinguished by different values of the TCI, may correspond to QCL relationships with different reference signal transmissions. For example, each TCI state may be associated with one of the previously received reference signals. By configuring the TCI states at UE 115-*a*, base station 105-*a* can dynamically select beams for downlink transmission to UE 115-*a*, and UE 115-*a* can select the corresponding receive beam to receive the downlink transmission. For a downlink transmission, base station 105-*a* may transmit an indication of the TCI state to UE 115-*a*, and UE 115-*a* may select the corresponding receive beam based on the indicated TCI state to receive the downlink transmission. In some cases, the TCI states may be configured via higher layer signaling.

In some cases, the number of TCI states configured at UE 115-*a* may be limited based on UE capability. UE 115-*a* may report its capability for a number of active TCI states to base station 105-*a*, and base station 105-*a* may configure that many active QCL assumptions for downlink control and data transmissions. As TCI states correspond to downlink beams, if the number of configured, or active, TCI states is limited at UE 115-*a*, the number of active downlink receive beams may also be limited. If, for example, UE 115-*a* indicates its capability to support one active TCI state, then downlink data and control transmissions may share a single active downlink receive beam. By limiting the number of active beams, the complexity at UE 115-*a* to identify a downlink receive beam for communicating with base station 105-*a* may be reduced.

In an example, UE 115-*a* may have a TCI state configured which associates base station beam 205-*a* and UE beam 210-*a*. Base station beam 205-*a* and UE beam 210-*a* may be at least spatially quasi co-located such that the two beams point toward each other, which may lead to a strong connection. Thus, when base station 105-*a* transmits a TCI indicating the use of base station beam 205-*a* for a scheduled downlink transmission, UE 115-*a* may select UE beam 210-*a* as a receive beam to receive the scheduled transmission based on the QCL association. Base station 105-*a* may transmit to UE 115-*a* on a bandwidth part of a radio frequency spectrum band 215. A portion of the frequency resources for a period of time may be allocated for a control channel 220. Base station 105-*a* may transmit control signaling on a control resource set 225 of the control channel 220. The control signaling may schedule UE 115-*a* for a data transmission on a shared channel 230

UE 115-*a* may monitor for the control signaling using the QCL associated beam, beam 210-*a*, as the downlink receive beam. UE 115-*a* may search (e.g., by performing blind decodings) a search space corresponding to the control channel 220 for the control resource set 225 to receive the control signaling. In some cases, UE 115-*a* may be configured with a finite number of TCI states for control signaling, and UE 115-*a* may perform searches for control information for each of the TCI states configured for control signaling. UE 115-*a* may receive the control signaling and select a beam to use to receive the data transmission on the shared channel 230. Based on the indicated TCI state and the QCL association for UE beam 210-*a* and base station beam 205-*a*, UE 115-*a* may assume the channel characteristics for the shared channel 230 to receive the data transmission. Based on UE 115-*a* supporting one active QCL assumption and data and control signaling sharing a common downlink receive beam, UE 115-*a* may use the same downlink receive beam to monitor for the shared channel 230 and receive the data transmission.

There may be situations where the QCL assumption for a control resource set is updated. For example, a QCL assumption for a common control resource set associated with handover and cell management (e.g., control resource set 0) may be updated after UE 115-*a* performs a random access channel procedure. Base station 105-*a* may transmit multiple reference signals, each corresponding to a different beam, during the random access channel procedure. UE 115-*a* may measure the reference signals and transmit a random access channel preamble indicating the downlink beam with the strongest measured reference signal. The QCL assumption for control resource set 0 may then be updated to the beam indicated by the random access channel preamble.

However, if UE 115-*a* signals a capability of one active QCL assumption, UE 115-*a* may only be capable of using the one single downlink receive beam for downlink shared channel and downlink control channel reception related to all control resource sets based on the single active TCI state. If performing the random access channel procedure updates the QCL assumption for a control resource set to a downlink beam different from the downlink beam associated with the active TCI state, UE 115-*a* would have to use two different receive beams for the two different downlink beams, which would exceed the capability of UE 115-*a*. Instead, UE 115-*a* may implement techniques to reset a QCL assumption after a random access channel procedure when supporting a single active TCI state. In some cases, a single active TCI may correspond to one TCI shared by control and data. In some examples, there may be a second TCI dedicated to control based on UE capability signaling.

For example, if UE 115-*a* performs a random access channel procedure and indicates a base station beam 205 in the random access channel preamble which does not correspond to the single supported active TCI state, UE 115-*a* may deactivate, in some cases automatically deactivate, the active TCI state. UE 115-*a* may then use the downlink beam which was indicated in the random access channel procedure for all downlink control channel and downlink shared channel communications. Thus, UE 115-*a* may instead use the receive beam corresponding to the downlink beam indicated by the random access channel procedure instead of the downlink beam of the TCI state.

In an example, UE 115-*a* may have a TCI configuration for base station beam 205-*a*. UE 115-*a* may perform the random access channel procedure and determine that base station beam 205-*b* has the best quality based on the random access channel procedure. UE 115-*a* may determine to use UE beam 210-*b* as a receive beam for downlink transmissions on base station beam 205-*b*, for example based on a spatial QCL relationship between the beams. UE 115-*a* may indicate base station beam 205-*b* in the random access channel preamble, and the QCL of control resource set 0 may be updated based on the downlink beam selected in the random access channel procedure. Base station 105-*a* may transmit a random access channel response to UE 115-*a* on the selected downlink beam in response to receiving the random access channel preamble. However, base station beam 205-*b* does not correspond to the configured TCI state, so UE 115-*a* would use two downlink receive beams, including one downlink receive beam for the configured TCI state and one downlink receive beam for physical downlink shared channel (PDSCH) and physical downlink control channel (PDCCH) reception related to control resource set 0, which would exceed the UE capability.

To prevent exceeding UE capability, UE 115-*a* may deactivate the active TCI state and use the receive beam associated with control resource set 0 (e.g., base station beam 205-*b*) for at least all downlink control and data transmissions for all control resource sets. In some cases, UE 115-*a* may use the receive beam associated with control resource set 0 at least until an identified reference time associated with the random access procedure (e.g., until the end of a RAR window, the end of a RACH procedure, the end of a random access timer, etc.). In some cases, UE 115-*a* may deactivate the active TCI state after performing the random access channel procedure and selecting a different base station beam, then reconfigure the active TCI state to use a receive beam that is associated (e.g., QCL associated) with the selected base station beam. In some cases, base station 105-*a* may send control signaling at some time after the RACH procedure is performed to later reactivate the active TCI state, and the reactivated TCI state may then be used for subsequent PDSCH and PDCCH reception. In some cases, the TCI state for control resource set 0 may be reconfigured to a previously deactivated TCI state or to a new TCI state. In some cases, the QCL of control resource set 0 may be updated based on the selected downlink beam until base station 105-*a* re-activates a TCI state for control resource set 0. By using the techniques described herein, a UE 115 with the capability to support a single active TCI state may deactivate the single active TCI state based on selecting a different downlink beam during a random access channel procedure such that the UE 115 does not exceed its capability. The UE 115 may then use the downlink beam selected during the random access channel procedure for downlink data and control signaling.

Therefore, UE 115-*a* may use the beam indicated by the random access channel preamble to monitor the control resource set, the shared data channel, or both. In some cases, UE 115-*a* may identify a length of time for which to use the indicated beam. In some cases, UE 115-*a* may use the indicated beam for an amount of time based on the random access procedure. For example, UE 115-*a* may identify a reference time and use the indicated beam at least until the reference time. For example, UE 115-*a* may determine the reference time based on a length of a RAR window, a length or duration of the random access procedure, or the duration of a random access timer. UE 115-*a* may continue to use the indicated beam after the reference time has passed, or UE 115-a may return to using a previously configured beam (e.g., corresponding to the active TCI state or previously active TCI state).

In an example, UE 115-a signals a single active QCL assumption. The QCL of control resource set 0 may be updated based on a downlink beam selected in a random access procedure. The downlink beam selected in the random access procedure may be used at least until a reference time. For example, the downlink beam selected in the random access procedure may be used at least within a RAR window, until the random access procedure is completed, a random access timer (e.g., ra-ContentionResolutionTimer) expires, or another time based on a combination thereof. After the reference time, UE 115-a may either still use the downlink beam selected in the random access procedure, or UE 115-a may use the old active TCI state which was used before the random access procedure.

Figure 3:
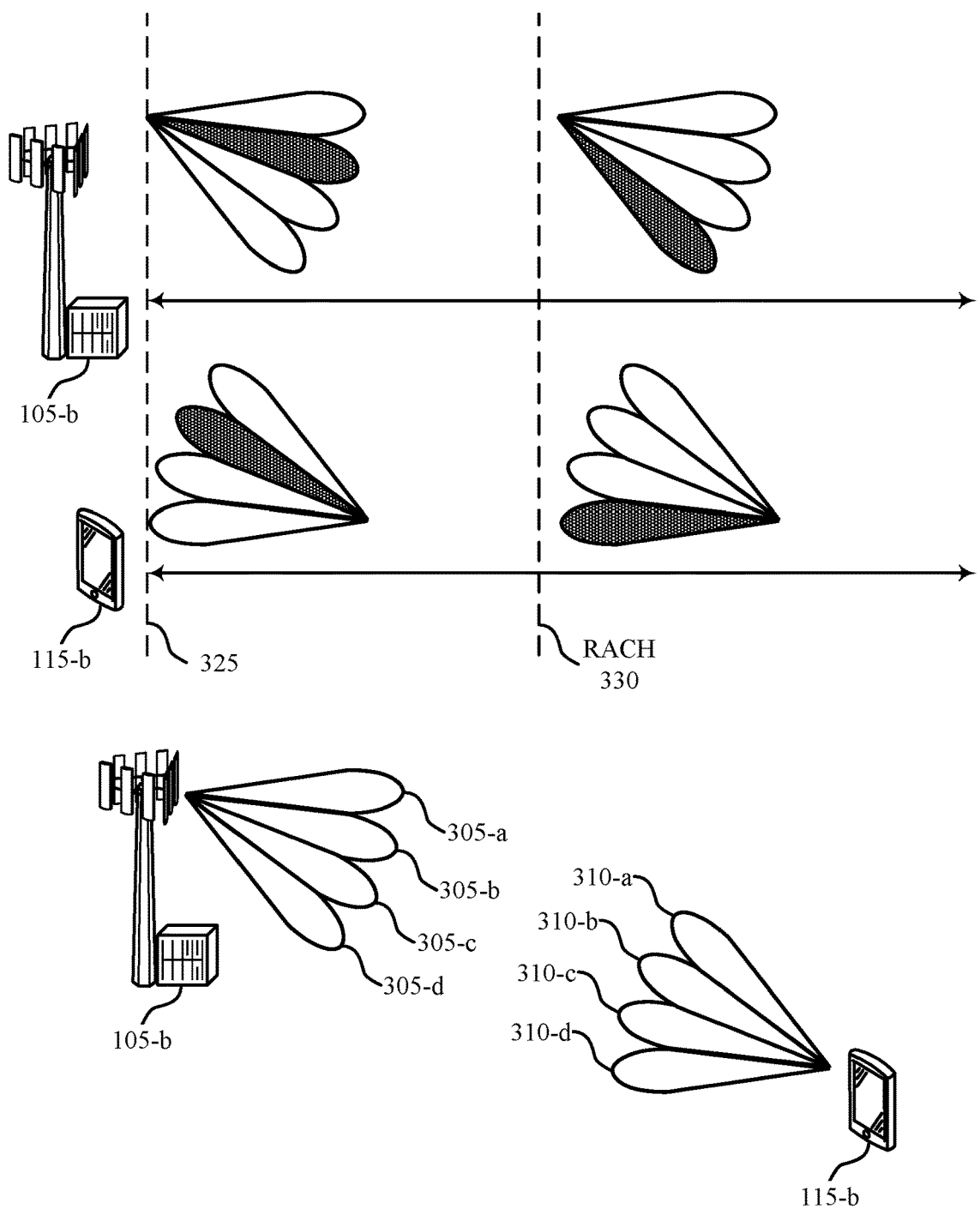
FIG. 3 illustrates an example of a transmit configuration indication state timeline in accordance with aspects of the present disclosure.

FIG. 3 illustrates an example of a TCI state timeline 300 in accordance with aspects of the present disclosure. In some examples, the TCI state timeline 300 may implement aspects of wireless communications system 100. The TCI state timeline 300 may include base station 105-b and UE 115-b, which may be respective examples of a base station 105 and a UE 115 as described herein. The TCI state timeline 300 may illustrate changes to the configured TCI states and beams used by UE 115-b and base station 105-b before and after performing a random access channel procedure.

UE 115-b and base station 105-b may communicate using beamformed communications as described in FIG. 1 and FIG. 2. Base station 105-b may directionally transmit or receive using one or more base station beams 305, and UE 115-b may directionally receive or transmit using one or more UE beams 310.

In some cases, UE 115-b may be capable of supporting a defined (e.g., limited) number of active TCI states. For example, UE 115-b may be capable of supporting one active TCI state. In this example, UE 115-b may be capable of supporting a single receive beam to receive data and control communications from base station 105-b. UE 115-b may report its capability to support a number of active TCI states per bandwidth part per component carrier, including control and data signaling. The capability may correspond to a defined (e.g., maximum) number of configured TCI states per component carrier for data transmission. If UE 115-b reports X active TCI states, it is not expected that any more than X active QCL assumptions (e.g., QCL type D assumptions) for any PDSCH and any control resource sets for a given bandwidth part of a serving cell become active for UE 115-b. UE 115-b may transmit signaling to base station 105-b indicating one active TCI state (e.g., indicate that only one TCI state can be supported), reporting the capability to support one active QCL assumption for downlink shared channel (e.g., PDSCH) and downlink control channel (e.g., PDCCH) transmissions. For example, in UE feature list of a feature group, a UE that reports X active TCI states may indicate up to X active QCL assumptions for PDCCH/PDSCH transmissions. As a special case, a UE indicating that X=1 may mean that up to all PDSCH/PDCCH transmissions may use single active DL beam.

In some cases, the capability signaling may be based on a frequency range in which UE 115-b operates. For component 1, the candidate value set may include {1, 2, 4, 8}, and for component 2, the candidate value set may include {4, 8, 16, 32, 64, 128}. For frequency range 2, UE 115-b may signal 64. For frequency range 1, UE 115-b may report at least the maximum number of allowed SSBs in the band. In some cases, UE 115-b may signal [64, 128] for the frequency range 2 values.

At 325, UE 115-b may have a first TCI state configured for base station beam 305-b and UE beam 310-b. UE 115-b may have signaled its number of active QCL assumptions, indicated that UE 115-b is capable of only using a single receive beam for all PDSCH and PDCCH reception related to all control resource sets based on the indicated single active TCI state. Base station 105-b may transmit a TCI indicating a QCL assumption for UE 115-b to use for downlink control and data signaling based on receiving the capability signaling. The first TCI state may be a data and control TCI 315, as UE 115-b only supports one active TCI state. Thus, when base station 105-b transmits downlink control signaling on base station beam 305-b to schedule a downlink data transmission on a downlink shared channel, UE 115-b selects UE beam 310-b and assumes the channel conditions for the downlink shared channel based on a QCL assumption of the first TCI state. For example, UE 115-b may assume that the demodulation reference signals for the downlink shared channel have the same properties as a reference signal in an SSB transmitted on base station beam 305-b. In some cases, base station 105-b may have configured the first TCI state via a MAC CE. Other base station beams 305, including base station beam 305-a, 305-c, and 305-d, may not be used at 325 for communication between UE 115-b and base station 105-b.

At 330, UE 115-b may perform a random access channel procedure (e.g., a RACH procedure). Base station 105-b may transmit a reference signal on multiple beams, and UE 115-b may measure the different reference signals. UE 115-b may identify the downlink beam with the highest quality reference signal and transmit an indication of the identified downlink beam in a random access channel preamble to base station 105-b. Base station 105-b may transmit a random access response to UE 115-b on the selected downlink beam. In some cases, the identified downlink beam may be associated with a receive beam other than the receive beam configured in the active TCI state. For example, the identified downlink beam may be base station beam 305-d, which may be paired with UE beam 310-d. However, by selecting base station beam 305-d in the random access channel procedure, UE 115-b may update the QCL association for control resource set 0 based on the downlink beam selected in the random access channel procedure to base station beam 305-d and UE beam 310-d.

Instead of attempting to support two different receive beams and exceeding the capability of UE 115-b, UE 115-b may, in some cases, instead deactivate the first active TCI state. Then, at least all downlink shared channel and downlink control channel reception related to control resource sets may be based on the receive beam for control resource set 0 (e.g., which was updated during the random access channel procedure). In some cases, UE 115-b may reconfigure the active TCI state to be associated with base station beam 305-d and UE beam 310-d instead of the beams of the first active TCI state. As shown, after the random access channel procedure at 330, the active TCI state is reconfigured to be for base station beam 305-d and UE beam 310-d. UE 115-b may then use UE beam 310-d for all data and control signaling, where base station 105-b uses base station beam 305-d. After the reconfiguring, base station beam 305-a and UE beam 310-a may be unused.

In some cases, UE 115-b may identify a reference time associated with the random access procedure at 330. For example, the reference time may be based at least in part on an end of a RAR window, an end of the random access procedure, or based on a random access timer. After the random access channel procedure at 330, UE 115-b may use beam 310-d to monitor the control resource set, the shared data channel, or both, at least until the reference time has passed. UE 115-b may then continue to use beam 310-d and may deactivate the first active TCI state. In some cases, after the reference time has passed, UE 115-b may use the beam associated with the first active TCI state to monitor the control resource set, the shared data channel, or both.

In some cases, base station 105-b may later update the active TCI state for UE 115-b again. For example, base station 105-b may select another beam link pair for the active TCI state. In some cases, base station 105-b may configure previously used beams for the active TCI state. Base station 105-b may reconfigure the active TCI state by transmitting control signaling, such as a MAC CE, with the indicated TCI.

Figure 4:
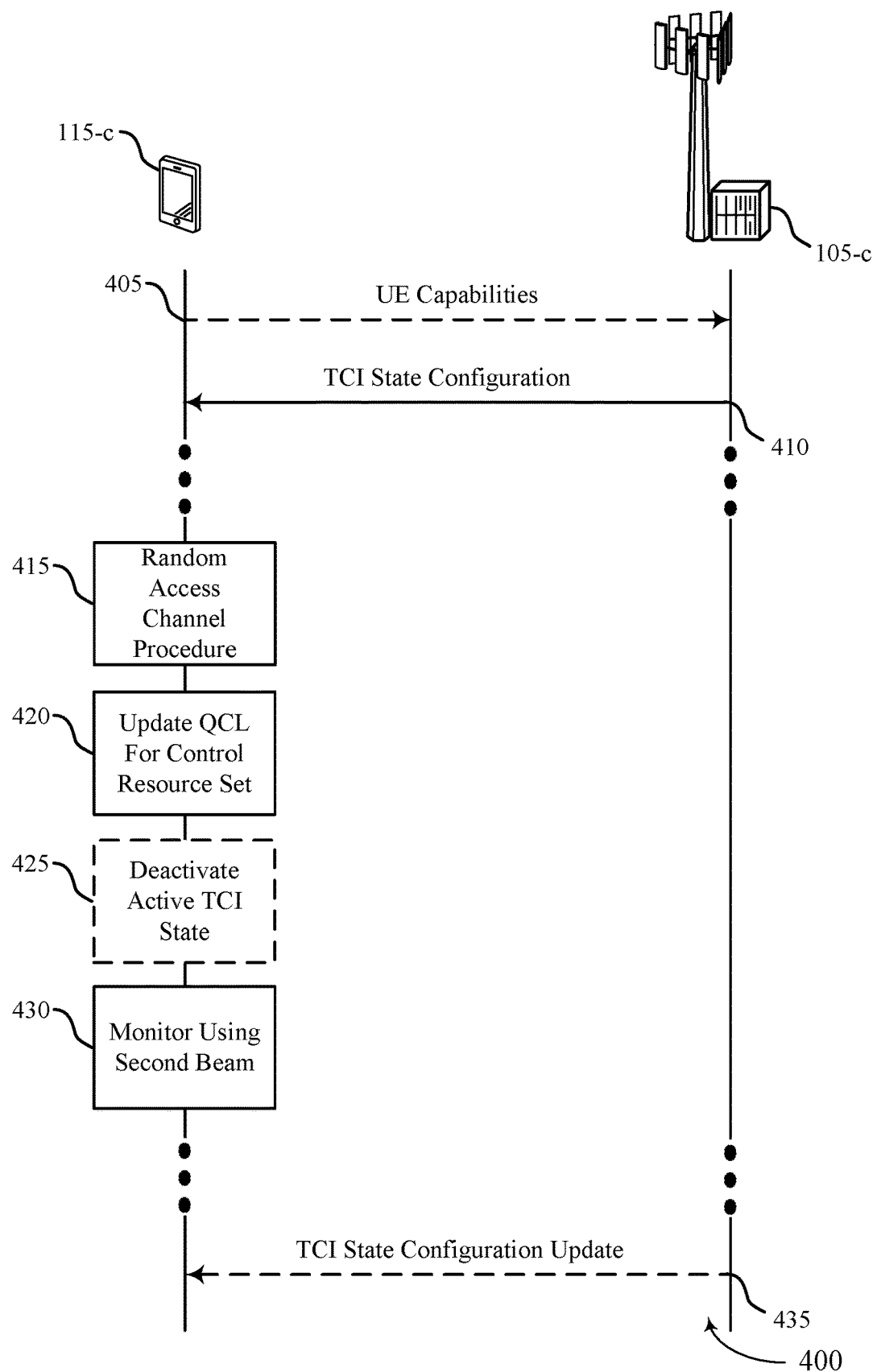
FIG. 4 illustrates an example of a process flow in accordance with aspects of the present disclosure.

FIG. 4 illustrates an example of a process flow 400 in accordance with aspects of the present disclosure. In some examples, process flow 400 may implement aspects of wireless communications system 100. The process flow 400 may include UE 115-c and base station 105-c, which may be respective examples of a UE 115 and a base station 105. UE 115-c may have the capability to support a defined (e.g., limited) number of active TCI states. For example, UE 115-c may have the capability to support a single active TCI state.

At 405, UE 115-c may transmit capability signaling indicating that UE 115-c supports a single active TCI state. For example, UE 115-c may signal one active QCL, indicating that UE 115-c is only capable of using one single receive beam for all PDSCH and PDCCH reception related to all control resource sets based on the single indicated active TCI state. At 410, base station 105-c may transmit configuration signaling configuring UE 115-c with a first active TCI state corresponding to a first beam for a control resource set and a shared data channel. As UE 115-c is capable of supporting one active TCI state at a time, UE 115-c may use the first beam for any data and control communications. In some cases, the configuration signaling may be based on the capability signaling.

At 415, UE 115-c may perform a random access channel procedure to select a second beam from a set of different beams. For example, base station 105-c may transmit a set of reference signals, where each reference signal of the set is transmitted on a respective beam of the set of different beams. UE 115-c may generate a set of reference signal measurements that each correspond to a respective beam of the set of different beams. UE 115-c may select a second beam based on the set of reference signal measurements. In an example, when performing random access channel procedure, except for contention free random access (CFRA) initiated by PDCCH order, the QCL assumption of CORESET 0 may be updated based on the downlink beam selected by the random access channel procedure until the TCI state is reactivated for CORESET 0.

At 420, UE 115-c may update a QCL assumption for the control resource set to correspond to the second beam. For example, UE 115-c may update the QCL assumption for control resource set 0 to the beam which is identified in the random access channel procedure and indicated in the random access channel preamble. The UE 115-c may identifying the second beam based on a measurement of the reference signal (e.g., strongest receive beam of a set of measured receive beams) performed during the random access channel procedure. In some cases, the control resource set may be an example of the control resource set 0 described herein.

In some cases, at 425, UE 115-c may deactivate the first active TCI state based on updating the QCL assumption. For example, by updating the QCL assumption for the control resource set, UE 115-c would monitor the second beam to receive a random access response. Because UE 115-c is capable of supporting just one receive beam, UE 115-c may deactivate the first active TCI state such that UE 115-c does not exceed its number of supported receive beams.

At 430, UE 115-c may monitor the control resource set, the shared data channel, or both, using the second beam. In some cases, UE 115-c may use the receive beam for coreset 0 for all PDSCH and/or PDCCH reception related to up to all control resource sets. In some cases, UE 115-c may receive, using the second beam, a control channel transmission via the control resource set. Additionally, or alternatively, UE 115-c may receive, using the second beam, a data transmission via the shared data channel. In some cases, UE 115-c may identify a reference time for which to use the second beam. For example, the reference time may be based at least in part on an end of a RAR window, an end of the random access procedure, or a random access timer. In some cases, UE 115-c may monitor the control resource set, the shared data channel, or both, using the first beam after the reference time. In some cases, UE 115-c may monitor the control resource set, the shared data channel, or both, using the second beam after the reference time.

At 435, UE 115-c may receive a second configuration signaling configuring a second active TCI state. UE 115-c may monitor the control resource set, the shared data channel, or both, using a third beam that corresponds to the second active TCI state. In this example, base station 105-c may reconfigure the TCI state for UE 115-c.

Advantageously, the techniques described herein may provide, for a UE signaling a support of a single active QCL, after the UE updates the QCL of a control resource set (e.g., CORESET 0) to correspond to a downlink receive beam selected in RACH, the UE may automatically deactivate the single active TCI state, and may use the downlink receive beam for CORESET 0 for at least up to all PDSCH and/or PDCCH reception related to up to all CORESETs. A base station may later reactivate the single TCI state to be used for up to all subsequent PDSCH and/or PDCCH reception.

Figure 5:
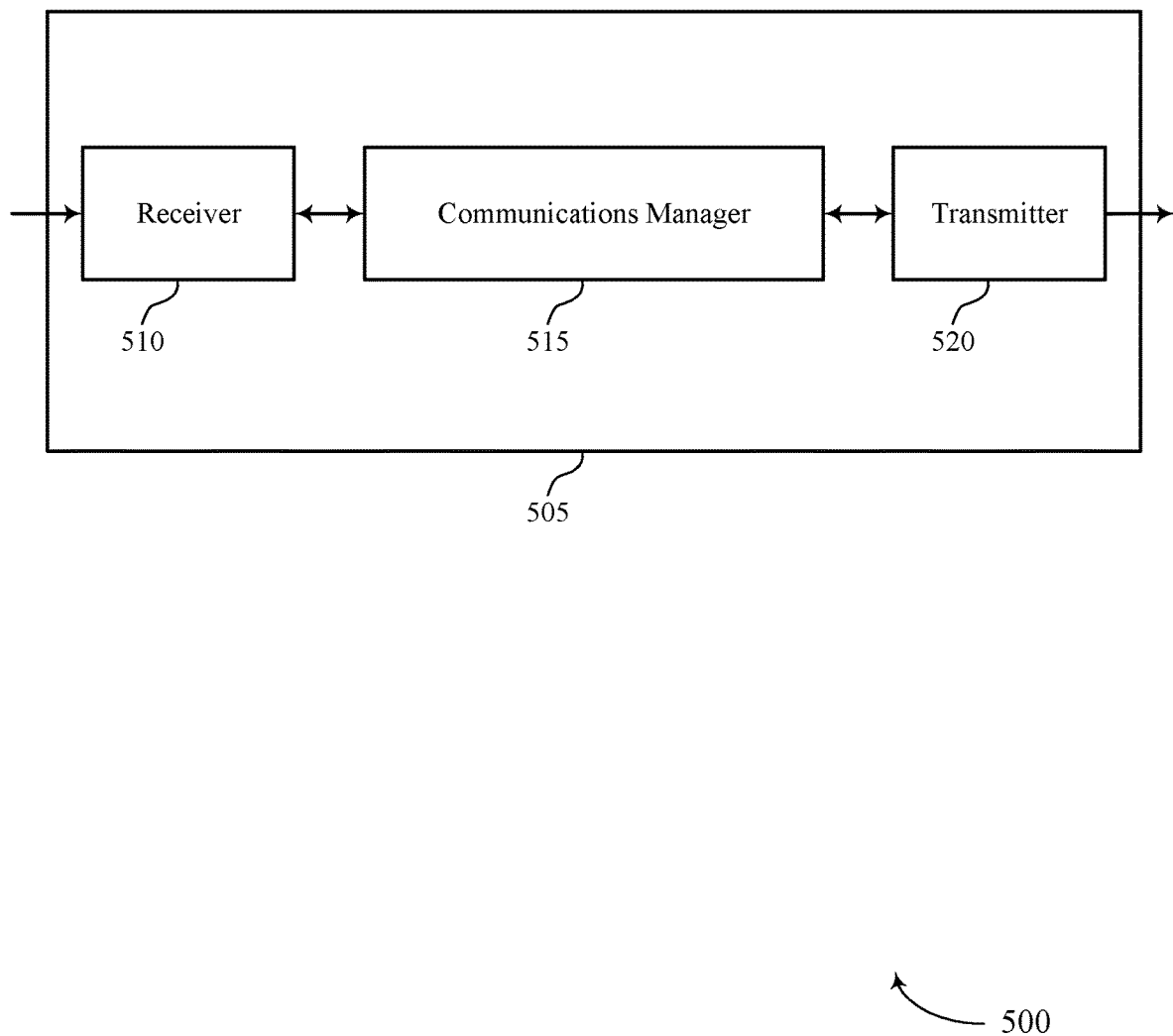
FIGS. 5 and 6 show block diagrams of devices that support quasi co-location reset for a user equipment supporting a single active transmission configuration indication state in accordance with aspects of the present disclosure.

FIG. 5 shows a block diagram 500 of a device 505 in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to quasi co-location reset for a user equipment supporting a single active transmission configuration indication state, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive configuration signaling configuring the UE with a first active transmission configuration indication state corresponding to a first beam for a control resource set and a shared data channel, perform a random access channel procedure to select a second beam from a set of different beams, update a quasi co-location assumption for the control resource set to correspond to the second beam, and monitor the control resource set, the shared data channel, or both, using the second beam. In some cases, the communications manager 515 may deactivate the first active transmission configuration indication state based on updating the quasi co-location assumption. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 515 as described herein may be implemented to realize one or more potential advantages. One implementation may reduce complexity for a UE 115 to select a TCI state based on selecting a new beam during a random access procedure. In some cases, the UE 115 may select a TCI state which improves throughput for the UE 115 or provides enhanced signaling based on the new TCI state being associated with a strong beam. Additionally, by using the techniques described herein, the UE 115 may support using beams selected in a random access procedure without exceeding the capability of the UE 115.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
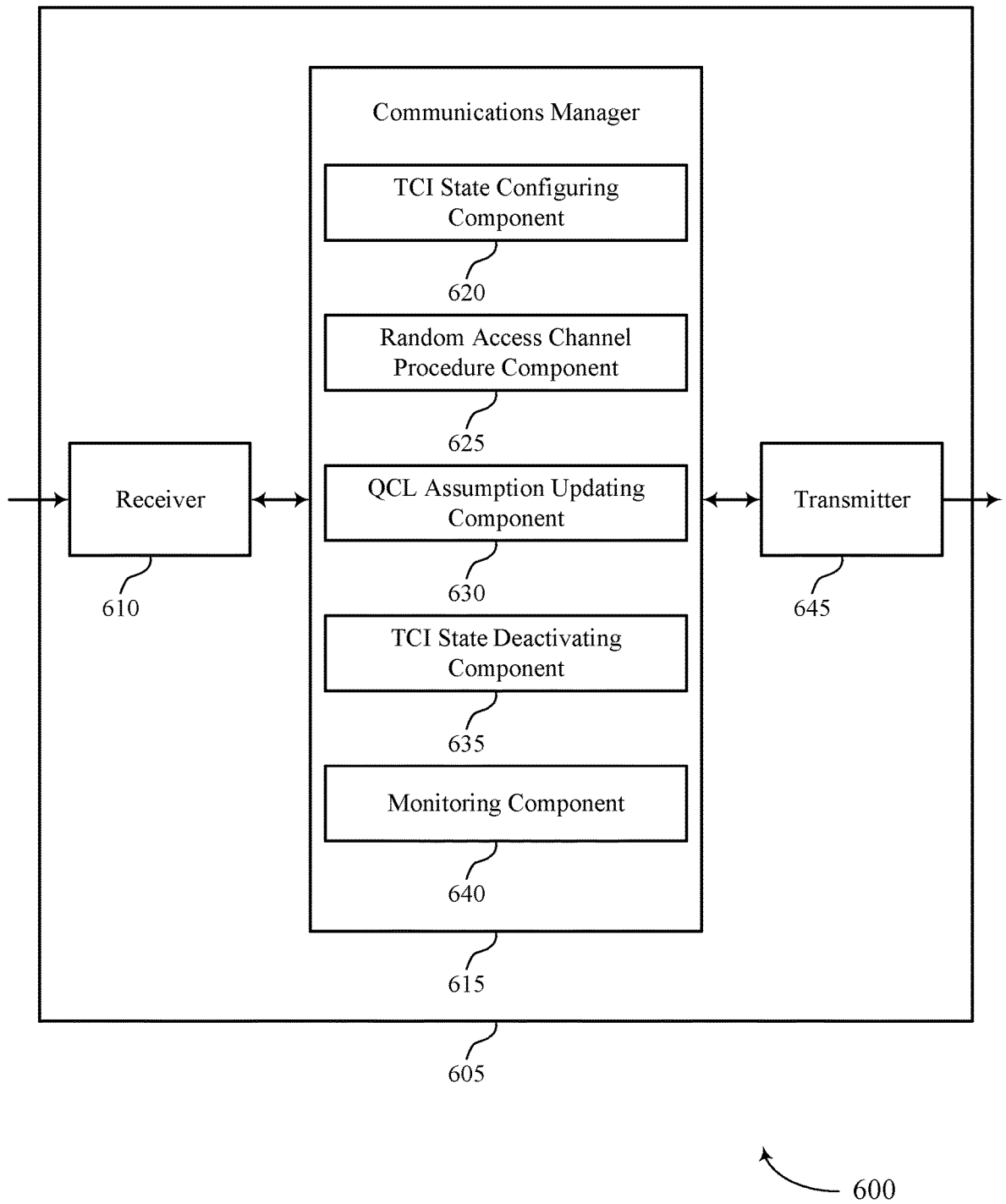

FIG. 6 shows a block diagram 600 of a device 605 in accordance with aspects of the present disclosure. The device 605 may be an example of aspects of a device 505, or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to quasi co-location reset for a user equipment supporting a single active transmission configuration indication state, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a TCI state configuring component 620, a random access channel procedure component 625, a QCL assumption updating component 630, a TCI state deactivating component 635, and a monitoring component 640. The communications manager 615 may be an example of aspects of the communications manager 810 described herein.

The TCI state configuring component 620 may receive configuration signaling configuring the UE with a first active transmission configuration indication state corresponding to a first beam for a control resource set and a shared data channel. The random access channel procedure component 625 may perform a random access channel procedure to select a second beam from a set of different beams. The QCL assumption updating component 630 may update a quasi co-location assumption for the control resource set to correspond to the second beam. In some cases, the TCI state deactivating component 635 may deactivate the first active transmission configuration indication state based on updating the quasi co-location assumption. The monitoring component 640 may monitor the control resource set, the shared data channel, or both, using the second beam.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
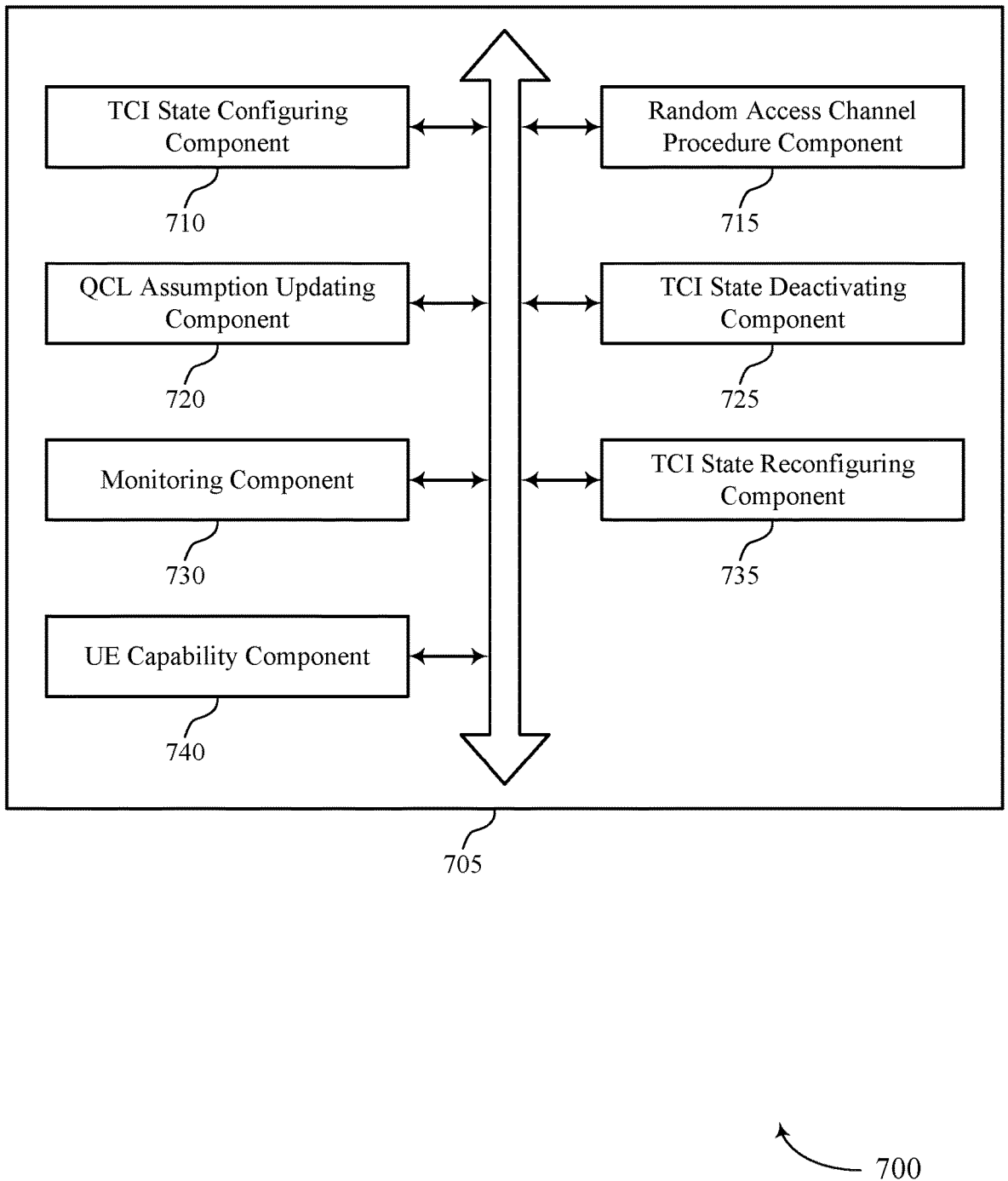
FIG. 7 shows a block diagram of a communications manager in accordance with aspects of the present disclosure.

FIG. 7 shows a block diagram 700 of a communications manager 705 in accordance with aspects of the present disclosure. The communications manager 705 may be an example of aspects of a communications manager 515, a communications manager 615, or a communications manager 810 described herein. The communications manager 705 may include a TCI state configuring component 710, a random access channel procedure component 715, a QCL assumption updating component 720, a TCI state deactivating component 725, a monitoring component 730, a TCI state reconfiguring component 735, and a UE capability component 740. Each of these modules may communicate, directly or indirectly, with one another (e.g., via one or more buses).

The TCI state configuring component 710 may receive configuration signaling configuring the UE with a first active transmission configuration indication state corresponding to a first beam for a control resource set and a shared data channel. The random access channel procedure component 715 may perform a random access channel procedure to select a second beam from a set of different beams. In some examples, the random access channel procedure component 715 may generate a set of reference signal measurements that each correspond to a respective beam of the set of different beams. In some examples, the random access channel procedure component 715 may select the second beam based on the set of reference signal measurements. In some examples, the random access channel procedure component 715 may identify a reference time associated with the random access procedure, where the UE monitors the control resource set, the shared data channel, or both, using the second beam at least until the reference time.

The QCL assumption updating component 720 may update a quasi co-location assumption for the control resource set to correspond to the second beam. In some examples, the TCI state deactivating component 725 may deactivate the first active transmission configuration indication state based on updating the quasi co-location assumption.

The monitoring component 730 may monitor the control resource set, the shared data channel, or both, using the second beam. In some examples, the monitoring component 730 may monitor the control resource set, the shared data channel, or both, using the second beam after the reference time. In some examples, the monitoring component 730 may receive, using the second beam, a control channel transmission via the control resource set. In some examples, the monitoring component 730 may receive, using the second beam, a data transmission via the shared data channel. In some examples, the monitoring component 730 may monitor the control resource set, the shared data channel, or both, using the first beam after the reference time.

The TCI state reconfiguring component 735 may receive a second configuration signaling configuring a second active transmission configuration indication state. In some examples, the TCI state reconfiguring component 735 may monitor the control resource set, the shared data channel, or both, using a third beam that corresponds to the second active transmission configuration indication state. In some examples, the TCI state reconfiguring component 735 may receive, using the third beam, a control channel transmission via the control resource set. In some examples, the TCI state reconfiguring component 735 may receive, using the third beam, a data transmission via the shared data channel. In some cases, the second active transmission configuration indication state differs from the first active transmission configuration indication state. In some cases, the TCI state reconfiguring component 735 may configure, based on updating the quasi co-location assumption for the control resource to correspond to the second beam, the receiver or the transmitter to use the second beam.

The UE capability component 740 may transmit capability signaling indicating that the UE supports a defined (e.g., limited) number of active transmission configuration indication states, where the configuration signaling is based on the capability signaling. For example, the UE capability component 740 may transmit capability signaling indicating that the UE supports a defined number (e.g., a single) of active transmission configuration states. In some cases, the defined number (e.g., single) active transmission configuration indication state indicates that the UE only supports a defined number (e.g., single) of one or more active downlink receive beams for control signaling and data signaling. In some cases, the defined number (e.g., a single) active transmission configuration indication state indicates that the UE only supports a defined number (e.g., a single) of one or more active downlink receive beams shared by both control and data channels.

Figure 8:
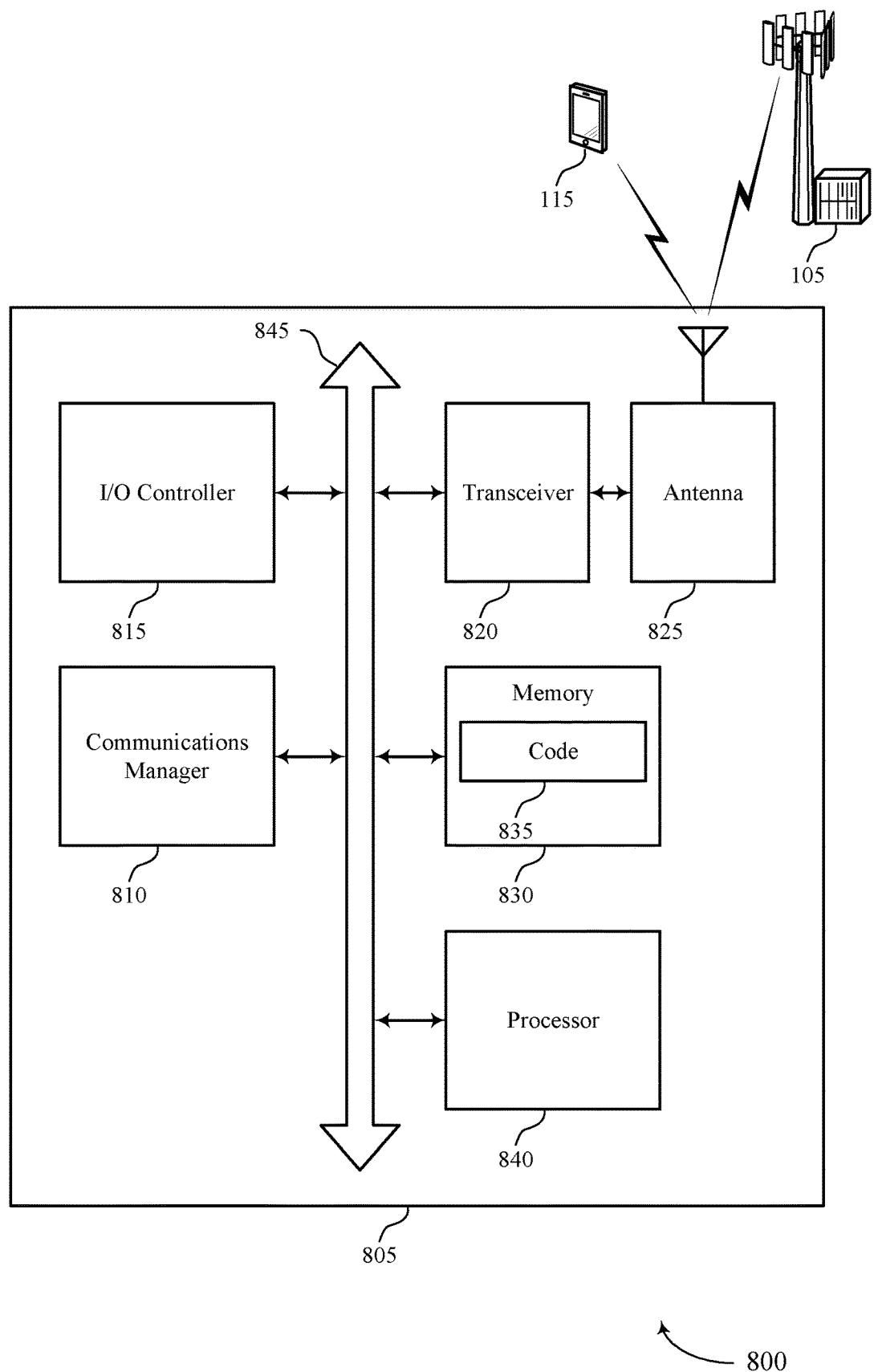
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive configuration signaling configuring the UE with a first active transmission configuration indication state corresponding to a first beam for a control resource set and a shared data channel, perform a random access channel procedure to select a second beam from a set of different beams, update a quasi co-location assumption for the control resource set to correspond to the second beam, and monitor the control resource set, the shared data channel, or both, using the second beam. In some cases, the communications manager 810 may deactivate the first active transmission configuration indication state based on updating the quasi co-location assumption.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting quasi co-location reset for a user equipment supporting a single active transmission configuration indication state).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
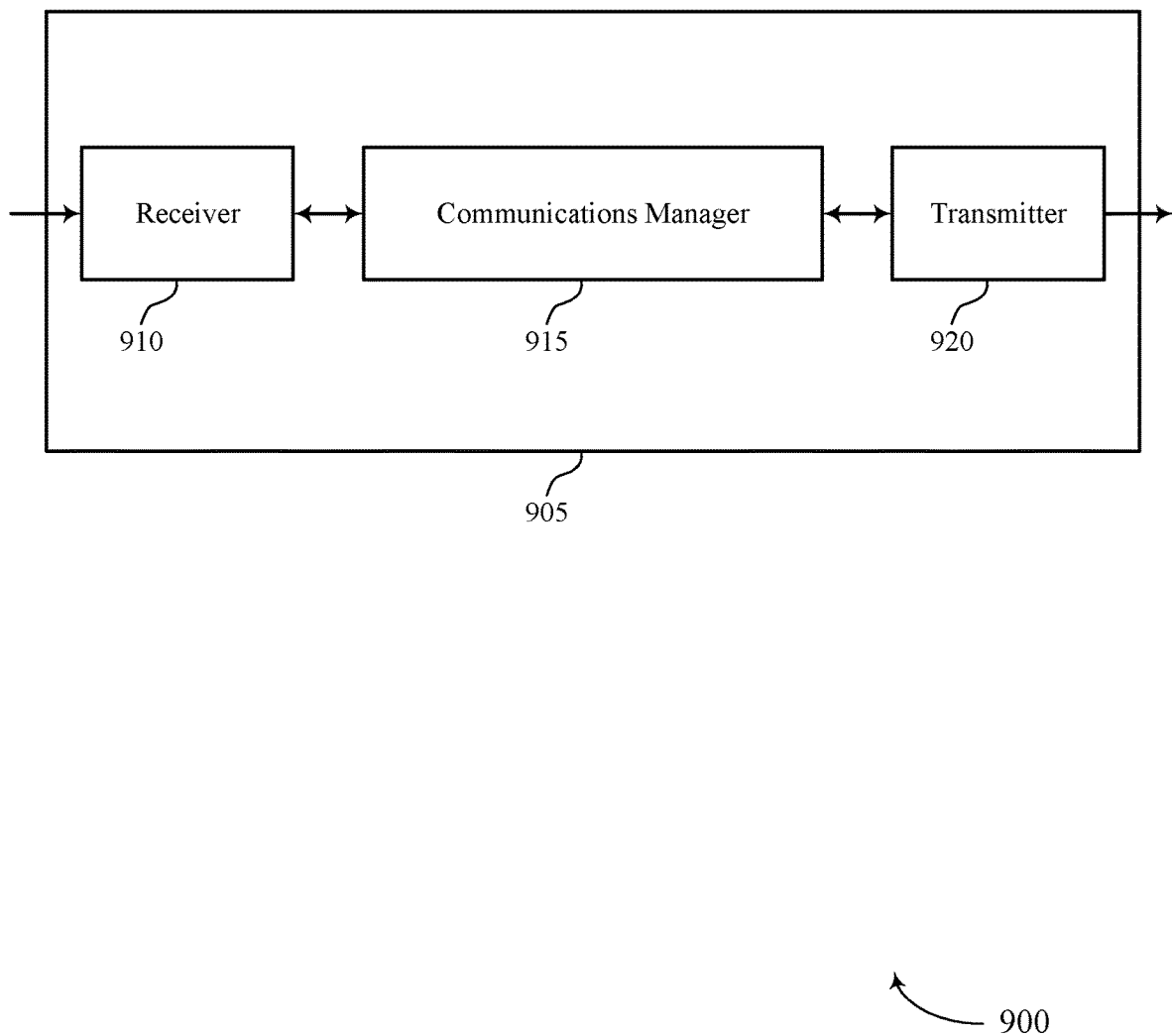
FIGS. 9 and 10 show block diagrams of devices that support quasi co-location reset for a user equipment supporting a single active transmission configuration indication state in accordance with aspects of the present disclosure.

FIG. 9 shows a block diagram 900 of a device 905 in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to quasi co-location reset for a user equipment supporting a single active transmission configuration indication state, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit configuration signaling configuring a UE with a first active transmission configuration indication state corresponding to a first beam for a control resource set and a shared data channel, perform a random access channel procedure with the UE to select a second beam from a set of different beams, update a quasi co-location assumption for the control resource set based on selecting the second beam, and transmit a transmission within the control resource set or the shared data channel using the second beam. In some examples, the communications manager 915 may deactivate the first active transmission configuration indication state based on updating the quasi co-location assumption. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
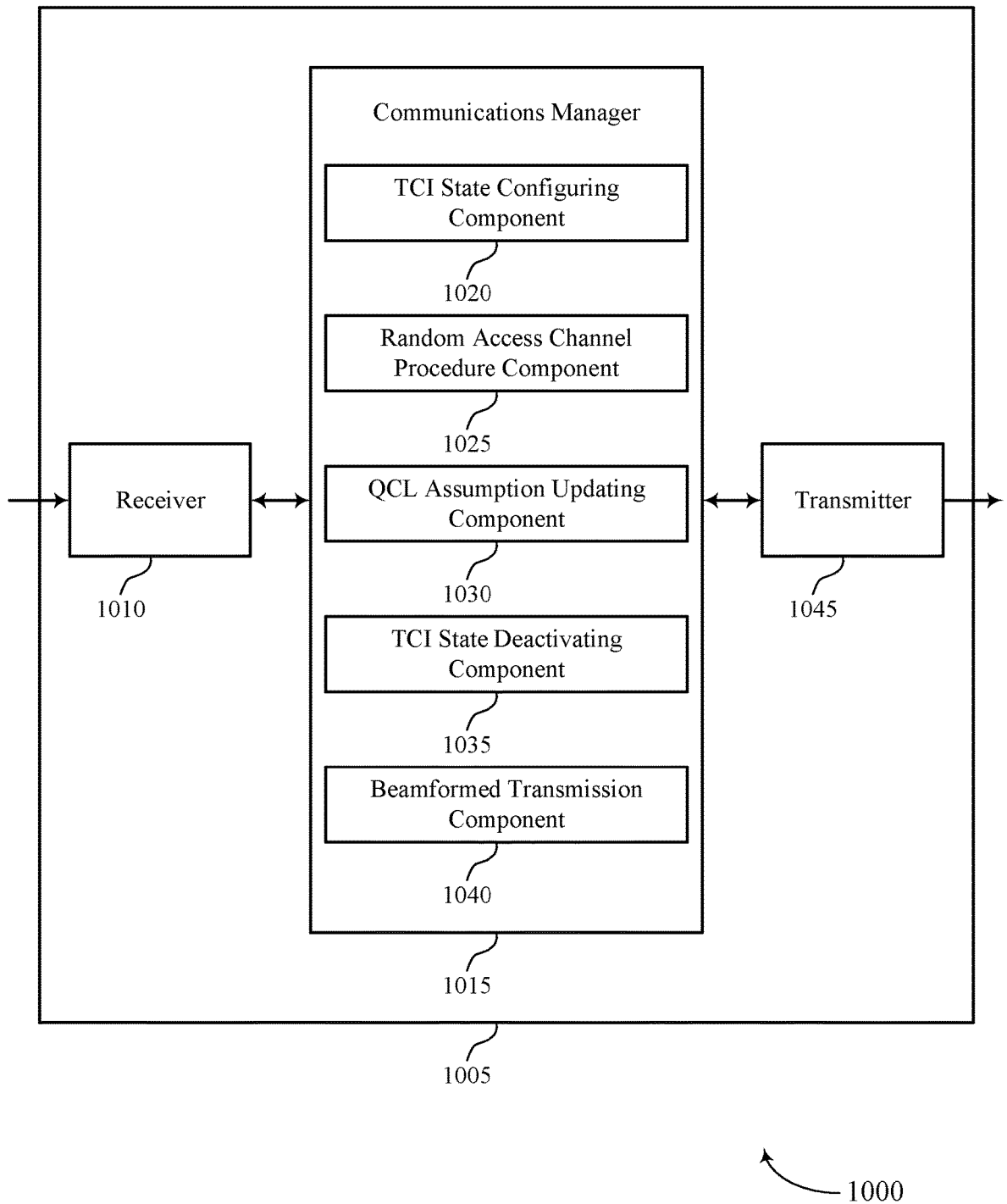

FIG. 10 shows a block diagram 1000 of a device 1005 in accordance with aspects of the present disclosure. The device 1005 may be an example of aspects of a device 905, or a base station 105 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to quasi co-location reset for a user equipment supporting a single active transmission configuration indication state, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a TCI state configuring component 1020, a random access channel procedure component 1025, a QCL assumption updating component 1030, a TCI state deactivating component 1035, and a beamformed transmission component 1040. The communications manager 1015 may be an example of aspects of the communications manager 1210 described herein.

The TCI state configuring component 1020 may transmit configuration signaling configuring a UE with a first active transmission configuration indication state corresponding to a first beam for a control resource set and a shared data channel. The random access channel procedure component 1025 may perform a random access channel procedure with the UE to select a second beam from a set of different beams. The QCL assumption updating component 1030 may update a quasi co-location assumption for the control resource set based on selecting the second beam. In some examples, the TCI state deactivating component 1035 may deactivate the first active transmission configuration indication state based on updating the quasi co-location assumption. The beamformed transmission component 1040 may transmit a transmission within the control resource set or the shared data channel using the second beam.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
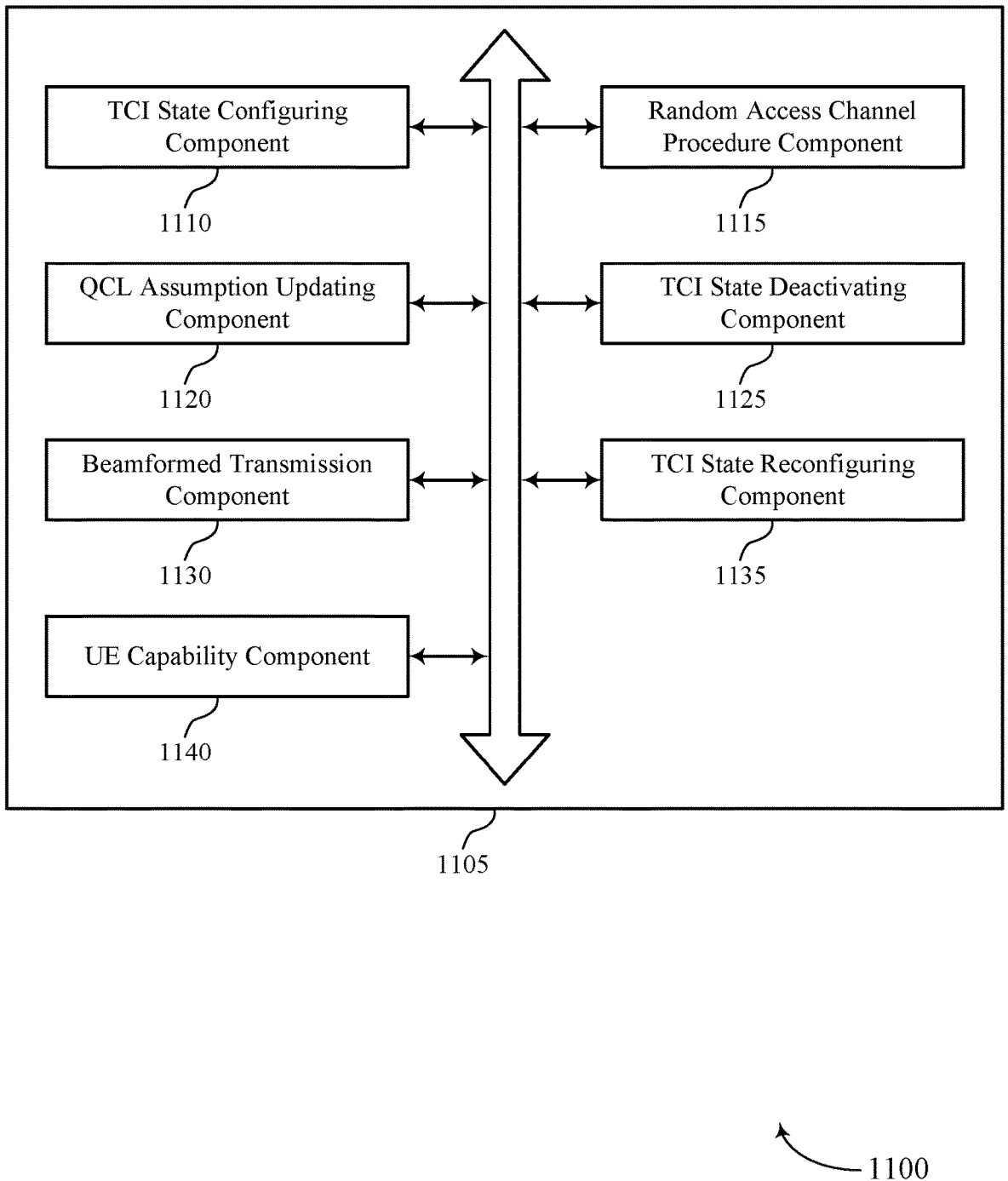
FIG. 11 shows a block diagram of a communications manager in accordance with aspects of the present disclosure.

FIG. 11 shows a block diagram 1100 of a communications manager 1105 in accordance with aspects of the present disclosure. The communications manager 1105 may be an example of aspects of a communications manager 915, a communications manager 1015, or a communications manager 1210 described herein. The communications manager 1105 may include a TCI state configuring component 1110, a random access channel procedure component 1115, a QCL assumption updating component 1120, a TCI state deactivating component 1125, a beamformed transmission component 1130, a TCI state reconfiguring component 1135, and a UE capability component 1140. Each of these modules may communicate, directly or indirectly, with one another (e.g., via one or more buses).

The TCI state configuring component 1110 may transmit configuration signaling configuring a UE with a first active transmission configuration indication state corresponding to a first beam for a control resource set and a shared data channel. The random access channel procedure component 1115 may perform a random access channel procedure with the UE to select a second beam from a set of different beams. In some examples, the random access channel procedure component 1115 may transmit a reference signal transmission on each beam of the set of different beams. In some examples, the random access channel procedure component 1115 may receive an indication of the second beam based on transmitting the reference signal transmission on each beam of the set of different beams.

The QCL assumption updating component 1120 may update a quasi co-location assumption for the control resource set based on selecting the second beam. In some examples, the TCI state deactivating component 1125 may deactivate the first active transmission configuration indication state based on updating the quasi co-location assumption.

The beamformed transmission component 1130 may transmit a transmission within the control resource set or the shared data channel using the second beam. In some examples, the beamformed transmission component 1130 may transmit, using the second beam, a control channel transmission via the control resource set. In some examples, the beamformed transmission component 1130 may transmit, using the second beam, a data transmission via the shared data channel. In some examples, the beamformed transmission component 1130 may transmit within the control resource set, the shared data channel, or both, using the second beam at least until the reference time associated with the random access procedure. In some examples, the beamformed transmission component 1130 may transmit within the control resource set, the shared data channel, or both, using the first beam after the reference time. In some examples, the beamformed transmission component 1130 may transmit within the control resource set, the shared data channel, or both, using the second beam after the reference time.

The TCI state reconfiguring component 1135 may transmit configuration signaling configuring a second active transmission configuration indication state. In some examples, the TCI state reconfiguring component 1135 may transmit a second transmission within the control resource set or the shared data channel using a third beam that corresponds to the second active transmission configuration indication state. In some examples, the TCI state reconfiguring component 1135 may transmit, using the third beam, a control channel transmission via the control resource set. In some examples, the TCI state reconfiguring component 1135 may transmit, using the third beam, a data transmission via the shared data channel. In some cases, the second active transmission configuration indication state differs from the first active transmission configuration indication state.

The UE capability component 1140 may receive capability signaling indicating that the UE supports a defined number of active transmission configuration indication state, where the configuration signaling is based on the capability signaling. For example, the UE capability component 1140 may receive capability signaling indicating that the UE supports a single active transmission configuration state. In some cases, the single active transmission configuration indication state indicates that the UE only supports a single active downlink receive beam for control signaling and data signaling. In some cases, the single active transmission configuration indication state indicates that the UE only supports a single active downlink receive beam shared by both control and data channels.

Figure 12:
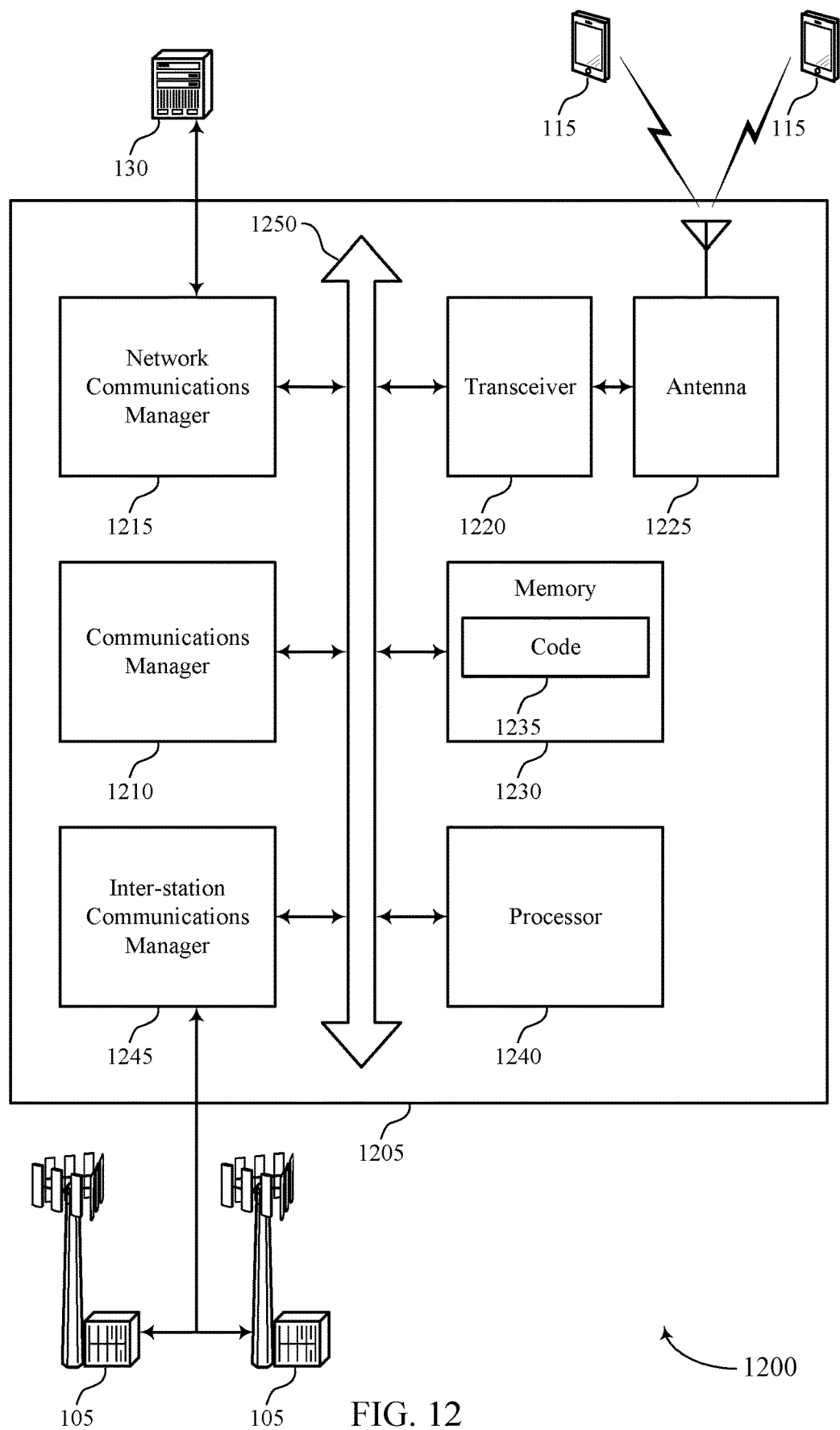
FIG. 12 shows a diagram of a system including a device in accordance with aspects of the present disclosure.

FIG. 12 shows a diagram of a system 1200 including a device 1205 in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit configuration signaling configuring a UE with a first active transmission configuration indication state corresponding to a first beam for a control resource set and a shared data channel, perform a random access channel procedure with the UE to select a second beam from a set of different beams, update a quasi co-location assumption for the control resource set based on selecting the second beam, and transmit a transmission within the control resource set or the shared data channel using the second beam. In some cases, the communications manager 1210 may deactivate the first active transmission configuration indication state based on updating the quasi co-location assumption.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting quasi co-location reset for a user equipment supporting a single active transmission configuration indication state).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
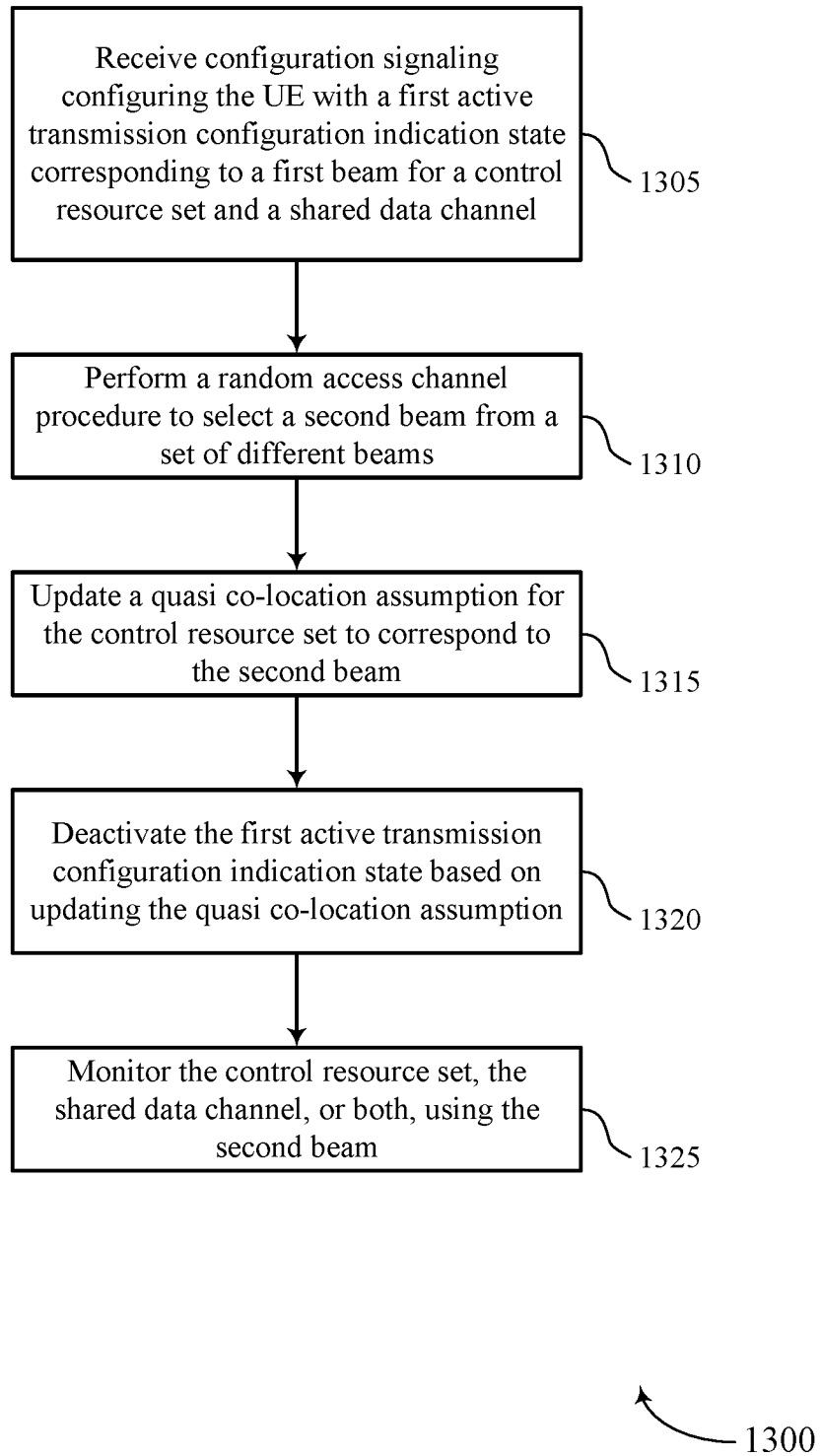
FIGS. 13 through 19 show flowcharts illustrating methods that support quasi co-location reset for a user equipment supporting a single active transmission configuration indication state in accordance with aspects of the present disclosure.

FIG. 13 shows a flowchart illustrating a method 1300 in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive configuration signaling configuring the UE with a first active transmission configuration indication state corresponding to a first beam for a control resource set and a shared data channel. The operations of 1305 may be performed according to the methods described herein. In some examples, aspects of the operations of 1305 may be performed by a TCI state configuring component as described with reference to FIGS. 5 through 8.

At 1310, the UE may perform a random access channel procedure to select a second beam from a set of different beams. The operations of 1310 may be performed according to the methods described herein. In some examples, aspects of the operations of 1310 may be performed by a random access channel procedure component as described with reference to FIGS. 5 through 8.

At 1315, the UE may update a quasi co-location assumption for the control resource set to correspond to the second beam. The operations of 1315 may be performed according to the methods described herein. In some examples, aspects of the operations of 1315 may be performed by a QCL assumption updating component as described with reference to FIGS. 5 through 8.

At 1320, the UE may deactivate the first active transmission configuration indication state based on updating the quasi co-location assumption. The operations of 1320 may be performed according to the methods described herein. In some examples, aspects of the operations of 1320 may be performed by a TCI state deactivating component as described with reference to FIGS. 5 through 8.

At 1325, the UE may monitor the control resource set, the shared data channel, or both, using the second beam. The operations of 1325 may be performed according to the methods described herein. In some examples, aspects of the operations of 1325 may be performed by a monitoring component as described with reference to FIGS. 5 through 8.

Figure 14:
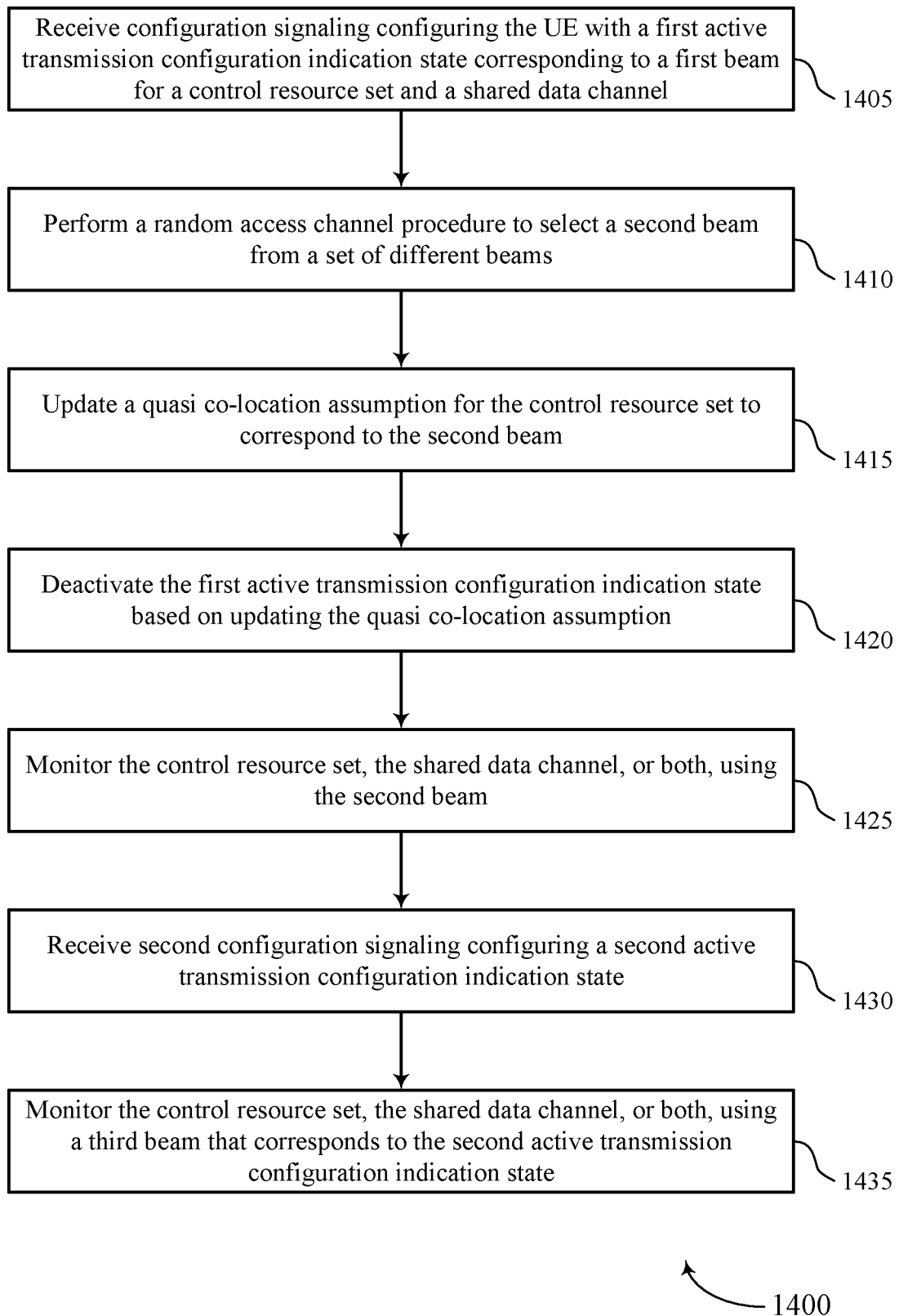

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive configuration signaling configuring the UE with a first active transmission configuration indication state corresponding to a first beam for a control resource set and a shared data channel. The operations of 1405 may be performed according to the methods described herein. In some examples, aspects of the operations of 1405 may be performed by a TCI state configuring component as described with reference to FIGS. 5 through 8.

At 1410, the UE may perform a random access channel procedure to select a second beam from a set of different beams. The operations of 1410 may be performed according to the methods described herein. In some examples, aspects of the operations of 1410 may be performed by a random access channel procedure component as described with reference to FIGS. 5 through 8.

At 1415, the UE may update a quasi co-location assumption for the control resource set to correspond to the second beam. The operations of 1415 may be performed according to the methods described herein. In some examples, aspects of the operations of 1415 may be performed by a QCL assumption updating component as described with reference to FIGS. 5 through 8.

At 1420, the UE may deactivate the first active transmission configuration indication state based on updating the quasi co-location assumption. The operations of 1420 may be performed according to the methods described herein. In some examples, aspects of the operations of 1420 may be performed by a TCI state deactivating component as described with reference to FIGS. 5 through 8.

At 1425, the UE may monitor the control resource set, the shared data channel, or both, using the second beam. The operations of 1425 may be performed according to the methods described herein. In some examples, aspects of the operations of 1425 may be performed by a monitoring component as described with reference to FIGS. 5 through 8.

At 1430, the UE may receive second configuration signaling configuring a second active transmission configuration indication state. The operations of 1430 may be performed according to the methods described herein. In some examples, aspects of the operations of 1430 may be performed by a TCI state reconfiguring component as described with reference to FIGS. 5 through 8.

At 1435, the UE may monitor the control resource set, the shared data channel, or both, using a third beam that corresponds to the second active transmission configuration indication state. The operations of 1435 may be performed according to the methods described herein. In some examples, aspects of the operations of 1435 may be performed by a TCI state reconfiguring component as described with reference to FIGS. 5 through 8.

Figure 15:
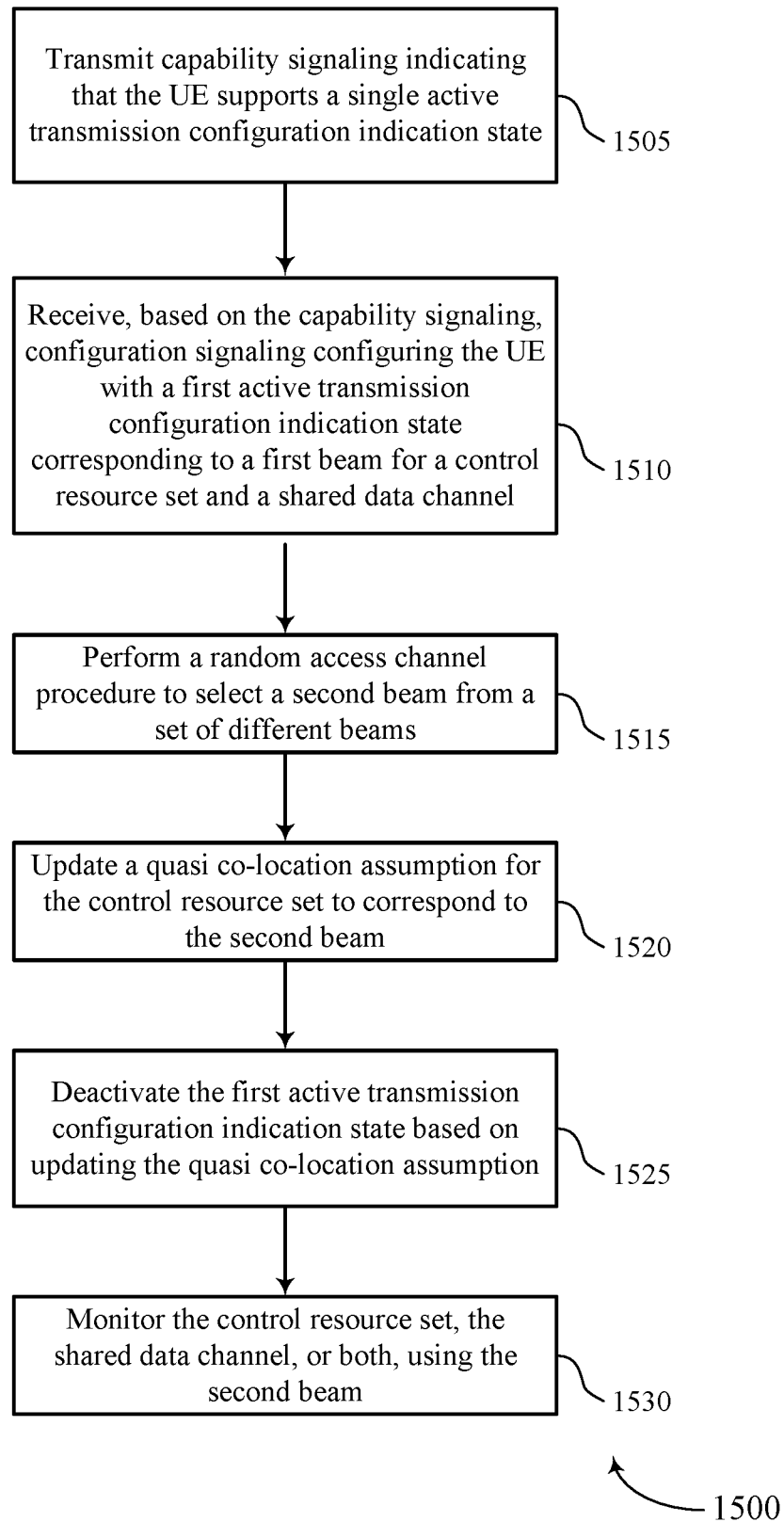

FIG. 15 shows a flowchart illustrating a method 1500 in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may transmit capability signaling indicating that the UE supports a single active transmission configuration indication state, where the configuration signaling is based on the capability signaling. The operations of 1505 may be performed according to the methods described herein. In some examples, aspects of the operations of 1505 may be performed by a UE capability component as described with reference to FIGS. 5 through 8.

At 1510, the UE may receive configuration signaling configuring the UE with a first active transmission configuration indication state corresponding to a first beam for a control resource set and a shared data channel. The operations of 1510 may be performed according to the methods described herein. In some examples, aspects of the operations of 1510 may be performed by a TCI state configuring component as described with reference to FIGS. 5 through 8.

At 1515, the UE may perform a random access channel procedure to select a second beam from a set of different beams. The operations of 1515 may be performed according to the methods described herein. In some examples, aspects of the operations of 1515 may be performed by a random access channel procedure component as described with reference to FIGS. 5 through 8.

At 1520, the UE may update a quasi co-location assumption for the control resource set to correspond to the second beam. The operations of 1520 may be performed according to the methods described herein. In some examples, aspects of the operations of 1520 may be performed by a QCL assumption updating component as described with reference to FIGS. 5 through 8.

At 1525, the UE may deactivate the first active transmission configuration indication state based on updating the quasi co-location assumption. The operations of 1525 may be performed according to the methods described herein. In some examples, aspects of the operations of 1525 may be performed by a TCI state deactivating component as described with reference to FIGS. 5 through 8.

At 1530, the UE may monitor the control resource set, the shared data channel, or both, using the second beam. The operations of 1530 may be performed according to the methods described herein. In some examples, aspects of the operations of 1530 may be performed by a monitoring component as described with reference to FIGS. 5 through 8.

Figure 16:
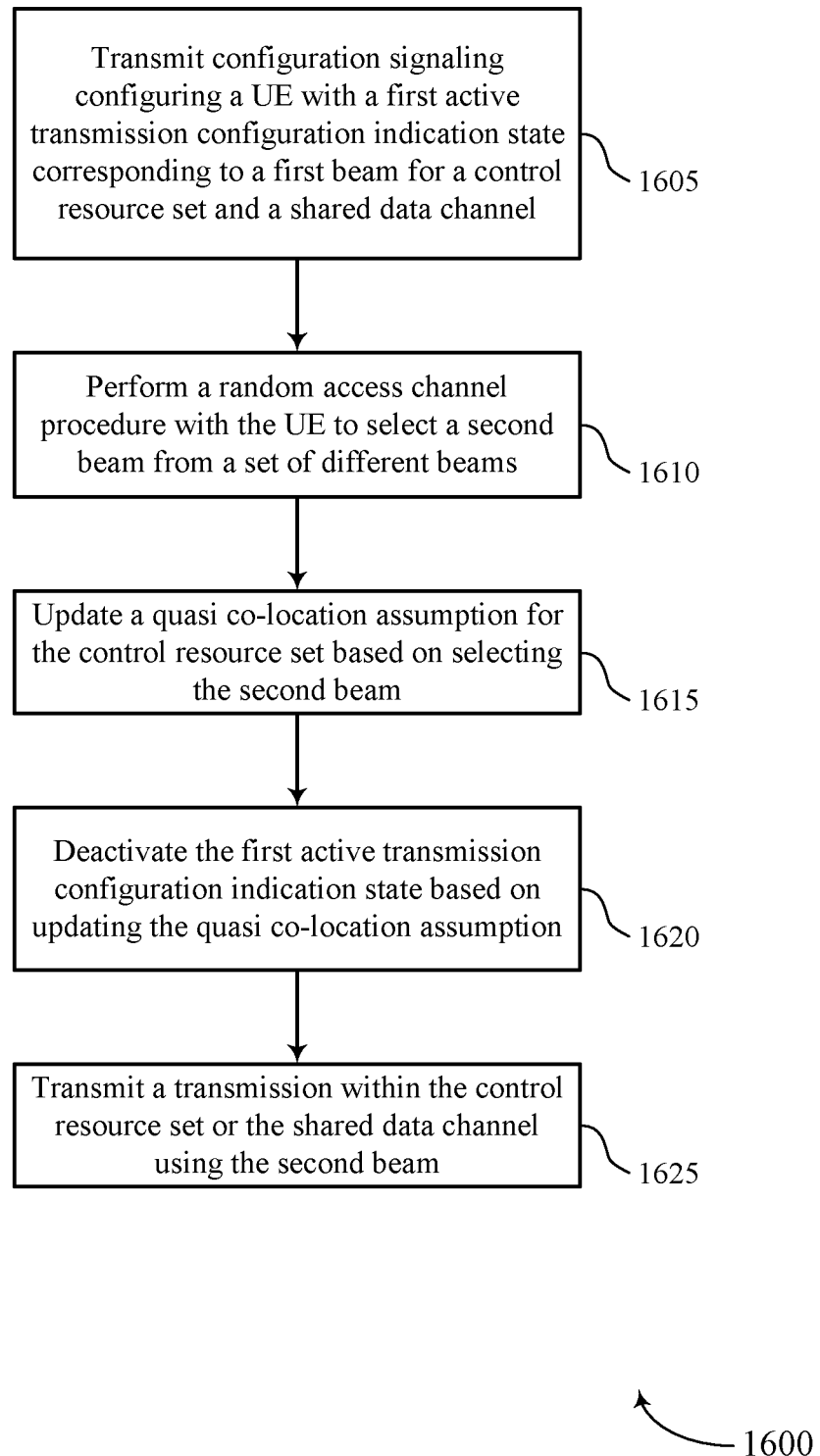

FIG. 16 shows a flowchart illustrating a method 1600 in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit configuration signaling configuring a UE with a first active transmission configuration indication state corresponding to a first beam for a control resource set and a shared data channel. The operations of 1605 may be performed according to the methods described herein. In some examples, aspects of the operations of 1605 may be performed by a TCI state configuring component as described with reference to FIGS. 9 through 12.

At 1610, the base station may perform a random access channel procedure with the UE to select a second beam from a set of different beams. The operations of 1610 may be performed according to the methods described herein. In some examples, aspects of the operations of 1610 may be performed by a random access channel procedure component as described with reference to FIGS. 9 through 12.

At 1615, the base station may update a quasi co-location assumption for the control resource set based on selecting the second beam. The operations of 1615 may be performed according to the methods described herein. In some examples, aspects of the operations of 1615 may be performed by a QCL assumption updating component as described with reference to FIGS. 9 through 12.

At 1620, the base station may deactivate the first active transmission configuration indication state based on updating the quasi co-location assumption. The operations of 1620 may be performed according to the methods described herein. In some examples, aspects of the operations of 1620 may be performed by a TCI state deactivating component as described with reference to FIGS. 9 through 12.

At 1625, the base station may transmit a transmission within the control resource set or the shared data channel using the second beam. The operations of 1625 may be performed according to the methods described herein. In some examples, aspects of the operations of 1625 may be performed by a beamformed transmission component as described with reference to FIGS. 9 through 12.

Figure 17:
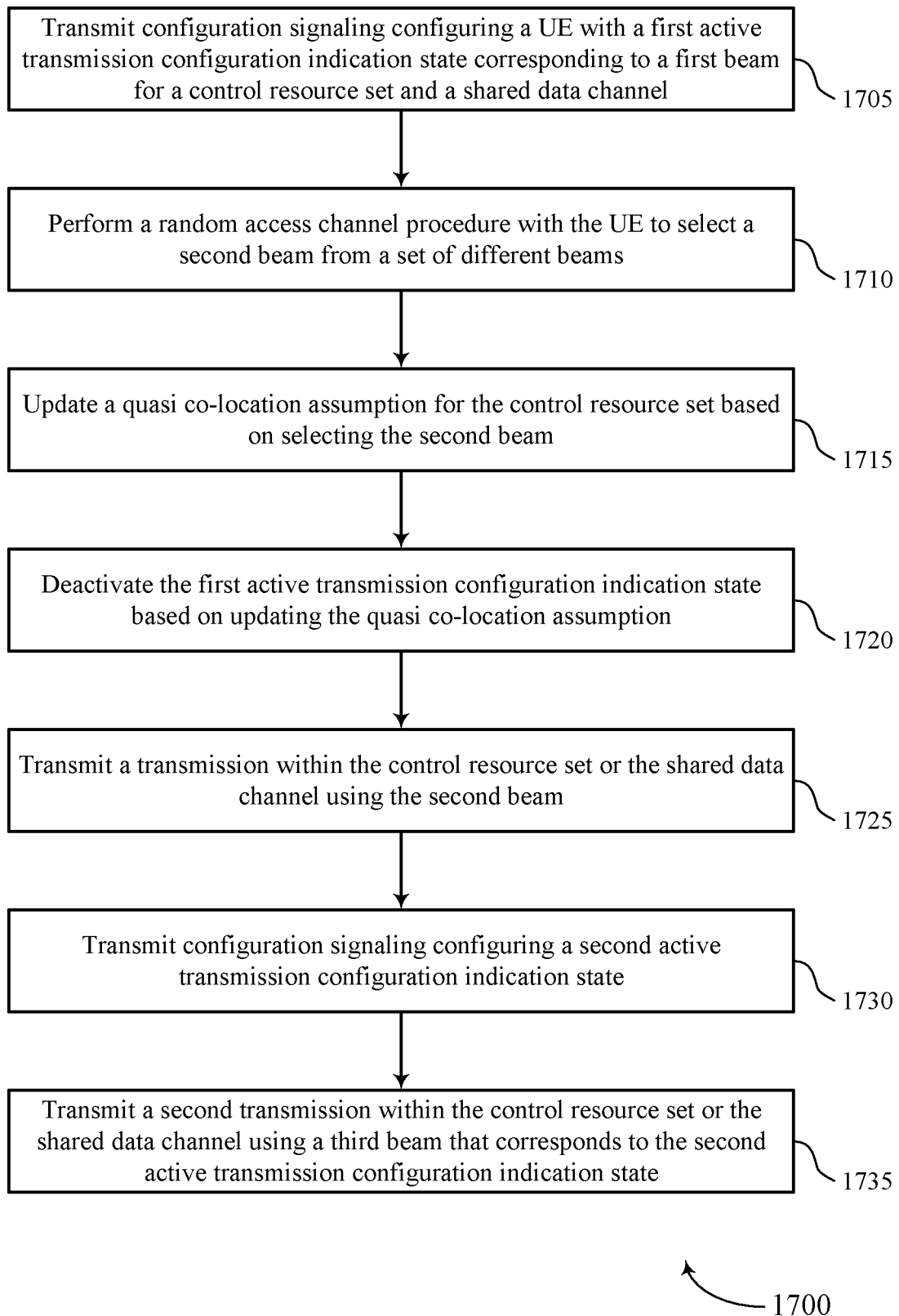

FIG. 17 shows a flowchart illustrating a method 1700 in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit configuration signaling configuring a UE with a first active transmission configuration indication state corresponding to a first beam for a control resource set and a shared data channel. The operations of 1705 may be performed according to the methods described herein. In some examples, aspects of the operations of 1705 may be performed by a TCI state configuring component as described with reference to FIGS. 9 through 12.

At 1710, the base station may perform a random access channel procedure with the UE to select a second beam from a set of different beams. The operations of 1710 may be performed according to the methods described herein. In some examples, aspects of the operations of 1710 may be performed by a random access channel procedure component as described with reference to FIGS. 9 through 12.

At 1715, the base station may update a quasi co-location assumption for the control resource set based on selecting the second beam. The operations of 1715 may be performed according to the methods described herein. In some examples, aspects of the operations of 1715 may be performed by a QCL assumption updating component as described with reference to FIGS. 9 through 12.

At 1720, the base station may deactivate the first active transmission configuration indication state based on updating the quasi co-location assumption. The operations of 1720 may be performed according to the methods described herein. In some examples, aspects of the operations of 1720 may be performed by a TCI state deactivating component as described with reference to FIGS. 9 through 12.

At 1725, the base station may transmit a transmission within the control resource set or the shared data channel using the second beam. The operations of 1725 may be performed according to the methods described herein. In some examples, aspects of the operations of 1725 may be performed by a beamformed transmission component as described with reference to FIGS. 9 through 12.

At 1730, the base station may transmit configuration signaling configuring a second active transmission configuration indication state. The operations of 1730 may be performed according to the methods described herein. In some examples, aspects of the operations of 1730 may be performed by a TCI state reconfiguring component as described with reference to FIGS. 9 through 12.

At 1735, the base station may transmit a second transmission within the control resource set or the shared data channel using a third beam that corresponds to the second active transmission configuration indication state. The operations of 1735 may be performed according to the methods described herein. In some examples, aspects of the operations of 1735 may be performed by a TCI state reconfiguring component as described with reference to FIGS. 9 through 12.

Figure 18:
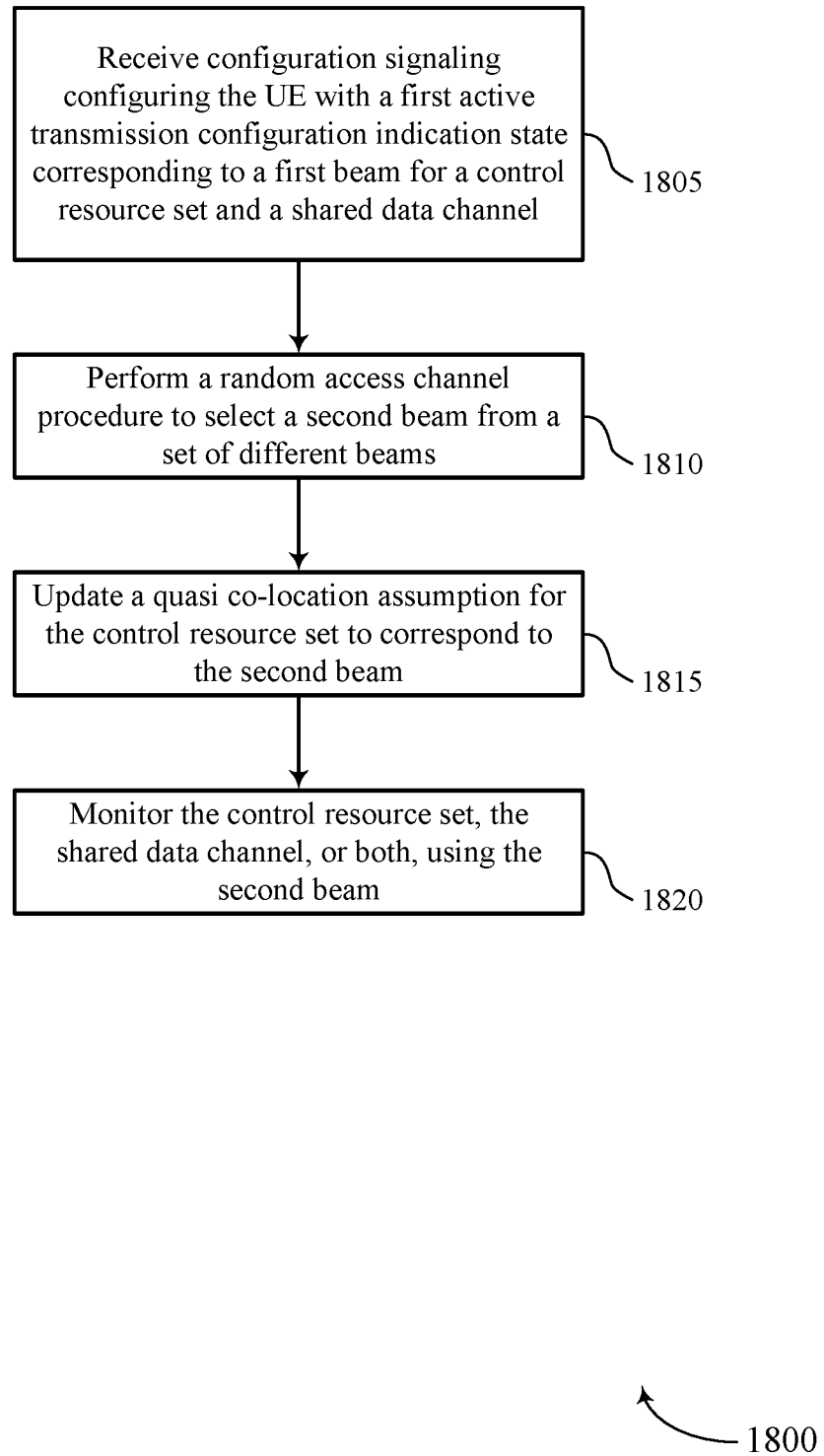

FIG. 18 shows a flowchart illustrating a method 1800 in accordance with aspects of the present disclosure. The operations of method 1800 may be implemented by a UE 115 or its components as described herein. For example, the operations of method 1800 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1805, the UE may receive configuration signaling configuring the UE with a first active transmission configuration indication state corresponding to a first beam for a control resource set and a shared data channel. The operations of 1805 may be performed according to the methods described herein. In some examples, aspects of the operations of 1805 may be performed by a TCI state configuring component as described with reference to FIGS. 5 through 8.

At 1810, the UE may perform a random access channel procedure to select a second beam from a set of different beams. The operations of 1810 may be performed according to the methods described herein. In some examples, aspects of the operations of 1810 may be performed by a random access channel procedure component as described with reference to FIGS. 5 through 8.

At 1815, the UE may update a quasi co-location assumption for the control resource set to correspond to the second beam. The operations of 1815 may be performed according to the methods described herein. In some examples, aspects of the operations of 1815 may be performed by a QCL assumption updating component as described with reference to FIGS. 5 through 8.

At 1820, the UE may monitor the control resource set, the shared data channel, or both, using the second beam. The operations of 1820 may be performed according to the methods described herein. In some examples, aspects of the operations of 1820 may be performed by a monitoring component as described with reference to FIGS. 5 through 8.

Figure 19:
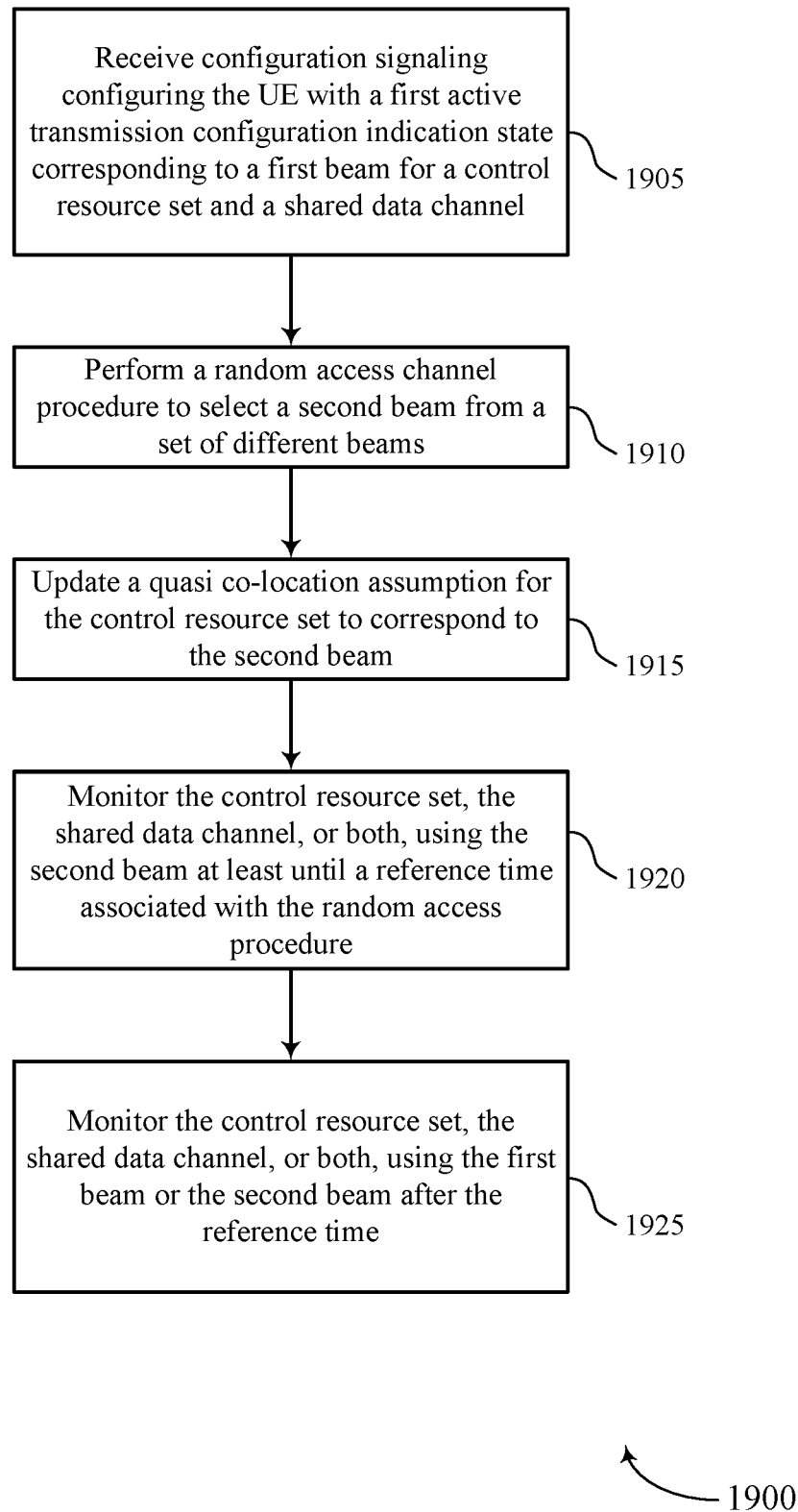

FIG. 19 shows a flowchart illustrating a method 1900 in accordance with aspects of the present disclosure. The operations of method 1900 may be implemented by a UE 115 or its components as described herein. For example, the operations of method 1900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1905, the UE may receive configuration signaling configuring the UE with a first active transmission configuration indication state corresponding to a first beam for a control resource set and a shared data channel. The operations of 1905 may be performed according to the methods described herein. In some examples, aspects of the operations of 1905 may be performed by a TCI state configuring component as described with reference to FIGS. 5 through 8.

At 1910, the UE may perform a random access channel procedure to select a second beam from a set of different beams. The operations of 1910 may be performed according to the methods described herein. In some examples, aspects of the operations of 1910 may be performed by a random access channel procedure component as described with reference to FIGS. 5 through 8.

At 1915, the UE may update a quasi co-location assumption for the control resource set to correspond to the second beam. The operations of 1915 may be performed according to the methods described herein. In some examples, aspects of the operations of 1915 may be performed by a QCL assumption updating component as described with reference to FIGS. 5 through 8.

At 1920, the UE may monitor the control resource set, the shared data channel, or both, using the second beam at least until a reference time associated with the random access procedure. The operations of 1920 may be performed according to the methods described herein. In some examples, aspects of the operations of 1920 may be performed by a monitoring component as described with reference to FIGS. 5 through 8.

At 1925, the UE may monitor the control resource set, the shared data channel, or both, using the first beam or the second beam after the reference time. The operations of 1925 may be performed according to the methods described herein. In some examples, aspects of the operations of 1925 may be performed by a monitoring component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
    transmitting capability signaling indicating that the UE supports a defined number of active transmission configuration indication states;
    receiving configuration signaling configuring the UE with a first active transmission configuration indication state indicating a quasi co-location assumption corresponding to a first beam for a control resource set and a shared data channel, wherein the configuration signaling is based at least in part on the capability signaling;
    performing a random access channel procedure to select a second beam from a plurality of different beams;
    updating the quasi co-location assumption for the control resource set to correspond to the second beam based at least in part on the UE supporting a single active transmission configuration indication state; and
    monitoring the control resource set, the shared data channel, or both, using the second beam.

2. The method of claim 1, wherein monitoring the control resource set, the shared data channel, or both, using the second beam further comprises:
    monitoring the control resource set, the shared data channel, or both, using the second beam at least until a reference time associated with the random access channel procedure.

3. The method of claim 2, further comprising:
    monitoring the control resource set, the shared data channel, or both, using the first beam after the reference time.

4. The method of claim 2, further comprising:
    monitoring the control resource set, the shared data channel, or both, using the second beam after the reference time.

5. The method of claim 4, further comprising:
    deactivating the first active transmission configuration indication state based at least in part on updating the quasi co-location assumption.

6. The method of claim 2, wherein the reference time is based at least in part on an end of a random access response window, an end of the random access channel procedure, or a random access timer, or any combination thereof.

7. The method of claim 1, wherein monitoring the control resource set, the shared data channel, or both, using the second beam further comprises:
    receiving, using the second beam, a control channel transmission via the control resource set.

8. The method of claim 1, wherein monitoring the control resource set, the shared data channel, or both, using the second beam further comprises:
    receiving, using the second beam, a data transmission via the shared data channel.

9. The method of claim 1, further comprising:
    receiving a second configuration signaling configuring a second active transmission configuration indication state; and
    monitoring the control resource set, the shared data channel, or both, using a third beam that corresponds to the second active transmission configuration indication state.

10. The method of claim 9, wherein the second active transmission configuration indication state differs from the first active transmission configuration indication state.

11. The method of claim 9, wherein monitoring the control resource set, the shared data channel, or both, using the third beam further comprises:
    receiving, using the third beam, a control channel transmission via the control resource set.

12. The method of claim 9, wherein monitoring the control resource set, the shared data channel, or both, using the third beam further comprises:
    receiving, using the third beam, a data transmission via the shared data channel.

13. The method of claim 1, wherein performing the random access channel procedure to select the second beam further comprises:
    generating a plurality of reference signal measurements that each correspond to a respective beam of the plurality of different beams; and
    selecting the second beam based at least in part on the plurality of reference signal measurements.

14. The method of claim 1, wherein the capability signaling indicates that the UE supports the single active transmission configuration indication state.

15. The method of claim 14, wherein the defined number of active transmission configuration indication states indicates that the UE only supports a defined number of one or more active downlink receive beams shared by both control and data channels.

16. A method for wireless communication by an access network entity, comprising:
receiving capability signaling indicating that a user equipment (UE) supports a defined number of active transmission configuration indication states;
transmitting configuration signaling configuring the UE with a first active transmission configuration indication state indicating a quasi co-location assumption corresponding to a first beam for a control resource set and a shared data channel, wherein the configuration signaling is based at least in part on the capability signaling;
performing a random access channel procedure with the UE to select a second beam from a plurality of different beams;
updating the quasi co-location assumption for the control resource set based at least in part on selecting the second beam and the UE supporting a single active transmission configuration indication state; and
transmitting a transmission within the control resource set or the shared data channel using the second beam.

17. The method of claim 16, further comprising:
transmitting within the control resource set, the shared data channel, or both, using the second beam at least until a reference time associated with the random access channel procedure.

18. The method of claim 17, further comprising:
transmitting within the control resource set, the shared data channel, or both, using the first beam after the reference time.

19. The method of claim 17, further comprising:
transmitting within the control resource set, the shared data channel, or both, using the second beam after the reference time.

20. The method of claim 19, further comprising:
deactivating the first active transmission configuration indication state based at least in part on updating the quasi co-location assumption.

21. The method of claim 17, wherein the reference time is based at least in part on an end of a random access response window, an end of the random access channel procedure, or a random access timer, or any combination thereof.

22. The method of claim 16, wherein transmitting the transmission within the control resource set or the shared data channel using the second beam further comprises:
transmitting, using the second beam, a control channel transmission via the control resource set.

23. The method of claim 16, wherein transmitting the transmission within the control resource set or the shared data channel using the second beam further comprises:
transmitting, using the second beam, a data transmission via the shared data channel.

24. The method of claim 16, further comprising:
transmitting configuration signaling configuring a second active transmission configuration indication state; and
transmitting a second transmission within the control resource set or the shared data channel using a third beam that corresponds to the second active transmission configuration indication state.

25. The method of claim 24, wherein the second active transmission configuration indication state differs from the first active transmission configuration indication state.

26. The method of claim 24, wherein transmitting the second transmission within the control resource set or the shared data channel using the third beam further comprises:
transmitting, using the third beam, a control channel transmission via the control resource set.

27. The method of claim 24, wherein transmitting the second transmission within the control resource set or the shared data channel using the third beam further comprises:
transmitting, using the third beam, a data transmission via the shared data channel.

28. The method of claim 16, wherein performing the random access channel procedure to select the second beam further comprises:
transmitting a reference signal transmission on each beam of the plurality of different beams; and
receiving an indication of the second beam based at least in part on transmitting the reference signal transmission on each beam of the plurality of different beams.

29. An apparatus for wireless communication by a user equipment (UE), comprising: a processor, memory in electronic communication with the processor; and instructions stored in the memory and executable by the processor to cause the apparatus to:
transmit capability signaling indicating that the UE supports a defined number of active transmission configuration indication states;
receive configuration signaling configuring the UE with a first active transmission configuration indication state indicating a quasi co-location assumption corresponding to a first beam for a control resource set and a shared data channel, wherein the configuration signaling is based at least in part on the capability signaling;
perform a random access channel procedure to select a second beam from a plurality of different beams;
update the quasi co-location assumption for the control resource set to correspond to the second beam based at least in part on the UE supporting a single active transmission configuration indication state; and
monitor the control resource set, the shared data channel, or both, using the second beam.

30. An apparatus for wireless communication by an access network entity, comprising: a processor, memory in electronic communication with the processor; and instructions stored in the memory and executable by the processor to cause the apparatus to:
receive capability signaling indicating that a user equipment (UE) supports a defined number of active transmission configuration indication states;
transmit configuration signaling configuring the UE with a first active transmission configuration indication state indicating a quasi co-location assumption corresponding to a first beam for a control resource set and a shared data channel, wherein the configuration signaling is based at least in part on the capability signaling;
perform a random access channel procedure with the UE to select a second beam from a plurality of different beams;
update the quasi co-location assumption for the control resource set based at least in part on selecting the second beam and the UE supporting a single active transmission configuration indication state; and transmit a transmission within the control resource set or the shared data channel using the second beam.

\* \* \* \* \*